(12) United States Patent
Silvester

(10) Patent No.: US 7,369,532 B2
(45) Date of Patent: May 6, 2008

(54) APPARATUS AND METHOD FOR AN AUDIO CHANNEL SWITCHING WIRELESS DEVICE

(75) Inventor: Kelan C. Silvester, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1161 days.

(21) Appl. No.: 10/085,661

(22) Filed: Feb. 26, 2002

(65) Prior Publication Data

US 2003/0161292 A1    Aug. 28, 2003

(51) Int. Cl.
*H04J 3/24*    (2006.01)
(52) U.S. Cl. .................................... 370/349; 455/553.1
(58) Field of Classification Search .................. None
See application file for complete search history.

(56) References Cited

U.S. PATENT DOCUMENTS

| | | | |
|---|---|---|---|
| 4,653,097 A | | 3/1987 | Watanabe et al. |
| 5,465,401 A | | 11/1995 | Thompson |
| 5,636,464 A | | 6/1997 | Ciluffo |
| 5,737,433 A | * | 4/1998 | Gardner ...................... 381/94.7 |
| 5,898,831 A | * | 4/1999 | Hall et al. ...................... 726/3 |
| 5,918,066 A | | 6/1999 | Chuang-Sung et al. |
| 6,028,853 A | * | 2/2000 | Haartsen ...................... 370/338 |
| 6,192,255 B1 | | 2/2001 | Lewis et al. |
| 6,275,500 B1 | * | 8/2001 | Callaway et al. ........... 370/449 |
| 6,324,271 B1 | | 11/2001 | Sawyer et al. |
| 6,366,622 B1 | | 4/2002 | Brown et al. |
| 6,430,395 B2 | | 8/2002 | Arazi et al. |
| 6,601,029 B1 | | 7/2003 | Pickering |
| 6,633,761 B1 | | 10/2003 | Singhal et al. |
| 6,650,888 B1 | | 11/2003 | Cook |
| 6,697,638 B1 | * | 2/2004 | Larsson et al. ........... 455/553.1 |
| 6,711,381 B1 | | 3/2004 | Cook et al. |
| 6,718,172 B1 | | 4/2004 | Cook et al. |
| 6,745,253 B2 | * | 6/2004 | Struble ........................ 710/10 |
| 6,766,160 B1 | | 7/2004 | Lemilainen et al. |
| 6,772,331 B1 | | 8/2004 | Hind et al. |
| 6,782,260 B2 | | 8/2004 | Nakakita et al. |

(Continued)

OTHER PUBLICATIONS

Krishnamurthy et al., "Security in Wireless Residential Networks", Feb. 2002, IEEE, pp. 157-166.

(Continued)

*Primary Examiner*—Chi Pham
*Assistant Examiner*—Phuc Tran
(74) *Attorney, Agent, or Firm*—Blakely, Sokoloff, Taylor & Zafman LLP

(57) ABSTRACT

An apparatus and method for an audio channel switching headset are described. The method includes detection of a plurality of audio sources within communication range of a wireless headset device. Once the plurality of audio sources are detected, an audio link may be established with a pre-determined number of the selected audio sources. Finally, a user of the headset device is provided, via a plurality of headset audio channels, access to each audio source within an established audio link. Accordingly, a user of such a headset device may listen to audio sources simultaneously or may toggle between various audio sources using a mechanical switch or voice-activated toggling of audio sources. Furthermore, a user may request additional audio channels, which are enabled by a host device, which multiplexes multiple audio sources with a single device audio link.

32 Claims, 20 Drawing Sheets

U.S. PATENT DOCUMENTS

| | | | |
|---|---|---|---|
| 6,795,688 B1 * | 9/2004 | Plasson et al. | 455/41.2 |
| 6,871,047 B2 * | 3/2005 | Iwata | 455/41.2 |
| 6,882,973 B1 | 4/2005 | Pickering | |
| 6,937,977 B2 | 8/2005 | Gerson | |
| 6,963,759 B1 | 11/2005 | Gerson | |
| 6,973,335 B2 * | 12/2005 | Ganton | 455/573 |
| 6,999,721 B2 * | 2/2006 | Ollis et al. | 455/41.2 |
| 7,219,123 B1 * | 5/2007 | Fiechter et al. | 709/203 |
| 2001/0037197 A1 | 11/2001 | Boulanov | |
| 2001/0044896 A1 | 11/2001 | Schwartz et al. | |
| 2001/0056349 A1 | 12/2001 | St. John | |
| 2002/0129264 A1 | 9/2002 | Rowland et al. | |
| 2003/0069844 A1 | 4/2003 | Koren | |
| 2004/0025047 A1 | 2/2004 | Mayne et al. | |
| 2004/0128519 A1 | 7/2004 | Klinger et al. | |

OTHER PUBLICATIONS

Pei et al., "Bluetooth—The Fastest Developing Wireless Technology", Aug. 2000, IEEE, pp. 1657-1664.

Haartsen, J.C., "The Bluetooth radio system", IEEE Personal Communications, vol. 7, issue 1, Feb. 2000, pp. 28-36.

Sedov et al., "Hardware Security Concept for Spontaneous Network Integration of Mobile Devices", Jun. 2001, Springer-Verlag, pp. 175-182.

Haartsen et al., "Bluetooth—A New Low-Power Radio Interface Providing Short-Range Connectivity", Oct. 2000, IEEE, pp. 1651-1661.

Habaux et al., "The Quest for Security in Model Ad Hoc Networks", 2001, ACM, pp. 146-155.

Sengodan et al., "On end-to-end security for Bluetooth/WAP and TCP/IP networks", Dec. 2000, Int'l Conf. on Personal Wireless Communications, IEEE, pp. 399-403.

U.S. Appl. No. 10/092,401, Office Action mailed Sep. 28, 2006.

Bluetooth, Specification of the Bluetooth System, vol. 1, ver. 1, p. 148-223, (Feb. 22, 2001).

Eustice et al, A universal information appliance, IBM Sys. J., vol. 38, No. 4, (1999).

Harmer et al., 3G products—what will the technology enable?, BT Technol J., vol. 19, No. 1 (Jan. 2001).

Olsen et al., Join and capture: a model for normadic interaction, UIST'01.

Zieniewicz et al., The evolution of army wearable computers, Pervasive Computing (Oct.-Dec. 2002).

* cited by examiner

APPARATUS AND METHOD FOR AN AUDIO CHANNEL SWITCHING WIRELESS DEVICE

FIELD OF THE INVENTION

The invention relates generally to the field of wireless devices. More particularly, the invention relates to a method and apparatus for an audio channel switching Bluetooth™ headset.

BACKGROUND OF THE INVENTION

The Bluetooth™ Radio System is designed according to a "Specification of the Bluetooth™ System," version 1.1, published Feb. 22, 2001 ("Bluetooth™ System Specification") as a wireless cable replacement solution based on radio frequency (RF) technology, with emphasis on robustness and low cost. Implementations of Bluetooth™ are based on high performance, yet low cost, integrated radio transceivers. The nominal range required of these integrated radio transceivers is set to approximately 10 meters by the Bluetooth™ Radio System. In addition, the frequency assignment that is utilized by Bluetooth™ within the United States is within the same radio frequency range as 802.11 wireless LAN (local area network), high-end portable home telephones, medical devices, as well as microwave ovens.

Bluetooth™ is targeted at mobile and business users who need to establish a link or small network between their computers, cellular phones or other peripherals. In fact, a Bluetooth™ radio in a phone, PDA (personal digital assistant), headset, notebook computer or other device enables the various devices to communicate with each other. As a result, Bluetooth™ is gaining popularity as a wireless cable replacement technology. Moreover, Bluetooth™ provides a new market segment and devices to solve an age old problem of excessive number of wires for portable personal computers (PCs) and other mobile devices.

Accordingly, Bluetooth™ technology may be applied to various devices, such as computer peripherals, including keyboards, mice, headsets, microphones, as well as host systems such as personal computers, laptops and networks, in order to communicate with other Bluetooth™ enabled devices. As such, a Bluetooth™ enabled device may come in contact with various Bluetooth™ enabled devices. When such is the case, the Bluetooth™ device may desire to establish an audio link with each detected device.

Currently, the Bluetooth™ specification enables such one-to-one communication connections between Bluetooth™ devices. Unfortunately, the capability of utilizing a Bluetooth™ device to simultaneously receive voice/data streams from multiple device audio sources is limited to a small number of devices. Currently, a limited capability is supported as described by the Bluetooth™ Radio Specification. Therefore, there remains a need to overcome one or more of the limitations in the above-described existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
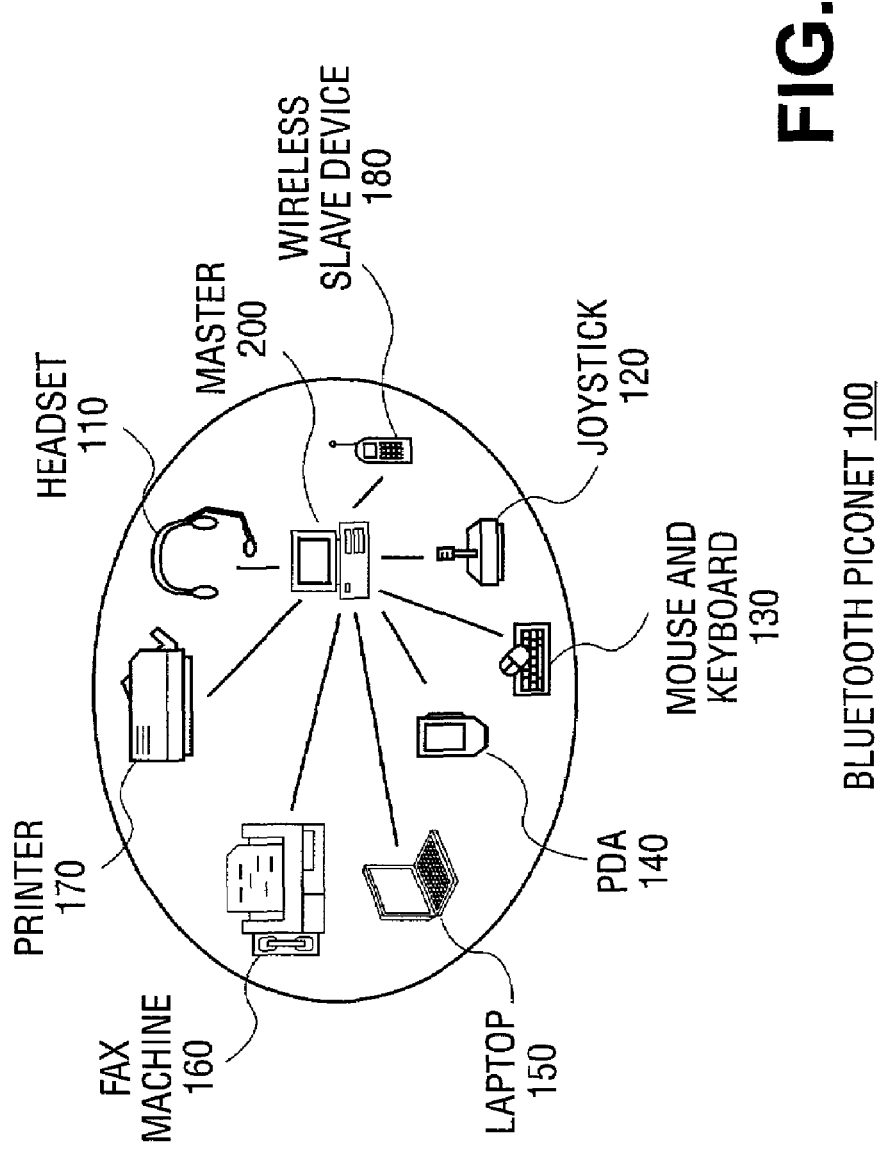
FIG. 1 depicts a block diagram illustrating a piconet utilizing a host computer, as well as wireless devices, configured to implement an audio channel switching wireless device, as well as audio source device multiplexing to generate multiple device audio channels, in accordance with one embodiment of the present invention.

A method and apparatus for an audio channel switching Bluetooth™ headset are described. The method includes detection of a plurality of audio sources within communication range of a wireless headset device. Once the plurality of audio sources are detected, an audio link may be established with a pre-determined number of the selected audio sources. Finally, a user of the headset device is provided, via a plurality of headset audio channels, access to each audio source within an established audio link. Accordingly, a user of such a headset device may listen to audio sources simultaneously or may toggle between various audio sources using a mechanical switch or voice-activated toggling of audio sources.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including handheld devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the methods of the present invention. Alternatively, the methods of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

Referring now to FIG. 1, FIG. 1 depicts a piconet 100, including a master, host computer 200, which supports multiplexing or combining of multiple audio sources within a single audio link and provides the audio link to a wireless device in order to enable audio channel switching by the wireless device in accordance with one embodiment of the present invention. As known to those skilled in the art, a piconet describes a collection of devices connected via Bluetooth™ technology in an ad hoc fashion.

Accordingly, the Bluetooth™ system supports both point to point connections or point to multi-point connections. In point to multi-point connections, a channel is shared amongst several Bluetooth™ units. Accordingly, two or more units sharing the same channel form a piconet. There is one master unit and up to seven active slave units in a piconet. These devices can be in either of the states: active park, hold and sniff. Likewise, multiple piconets with overlapping coverage form a scatter net (not shown).

As such, a piconet is initialized with two connective devices, such as for example, a portable computer and a mobile phone. The number of devices which can participate in a piconet is limited to eight units, as described above. Accordingly, as illustrated in FIG. 1, the various devices, including headset 110, joystick 120, mouse keyboard 130, personal digital assistant (PDA) 140, laptop computer 150, fax machine 160, printer 170 and wireless slave device 180 (illustrated as a cell phone), may participate in a piconet with the host computer 200.

As described above, piconets, such as piconet 100 as depicted in FIG. 1, are designed as wireless replacement technologies for implementing networks, such as illustrated in FIG. 1, without the need of wires for interconnecting the various devices. As such, a host computer 200 generally awaits page requests from the various devices in order to establish a connection between the host computer and authorized slave devices, such as for example, slave device 180. Once a Bluetooth™ unit has established a connection to a piconet, it may communicate by means of two link types.

Accordingly, between any two members of a piconet, which form a master slave pair, the following two link types are supported: synchronous connection oriented (SCO) link, and asynchronous connectionless (ACL) link. While the various link types between master and slave pairs may vary with time during a piconet session, the link type defines what type of packet can be used for a particular link. An SCO link, as referred to above, is a point to point full duplex link between a master and a slave. The link is established once by the master and kept alive until disconnected by the master. The SCO link is typically used for a voice connection, wherein the master reserves the slot used for the SCO link via a given channel.

In contrast, the ACL link provides a momentary connection between the master and any of the slaves within a piconet for the duration of one frame. In contrast to the SCO link, slots are not reserved for ACL links. As a result, the master can freely decide which slave to address and in which order. In order to accomplish this, the member subaddress (MAC address) in the packet determines which slave an ACL packet is transmitted to. In addition, the link is intended for asynchronous or isosynchronous data. However, if the master uses this link to address the same slave at regular intervals, it becomes a synchronous link. Consequently, an ACL link supports both full duplex and asymmetric modes.

Accordingly, the SCO link provides a circuit-switched connection between the master and a specific slave and is typically applied for time bound services, like voice. In addition, the SCO link supports only symmetric operation, i.e., full duplex. In contrast, the ACL link provides a packet switch connection between the master and all slaves participating in the piconet. Depending on the usage of the channel by SCO links, the ACL link can support any rate from full rate downward by varying the interval of transmissions.

Unfortunately, a single Bluetooth™ device is limited to support of three SCO (voice) channels. As a result, when a device needs or requires more than three audio/voice channels, there is no provision within the Bluetooth™ specification for implementing the device's request for multiple SCO channels. However, utilizing the teachings of the present invention, a host computer, such as host computer 200 as depicted in FIG. 1, may implement a packet embedding/encoding scheme in order to multiplex multiple voice channels into a single channel or audio link between a master and a host within a Bluetooth™ piconet. In one embodiment, this is performed by multiplexing one or more audio sources within a single channel by embedding or encoding additional voice data within a data voice packet, as will be described in further detail below.

Figure 2A:
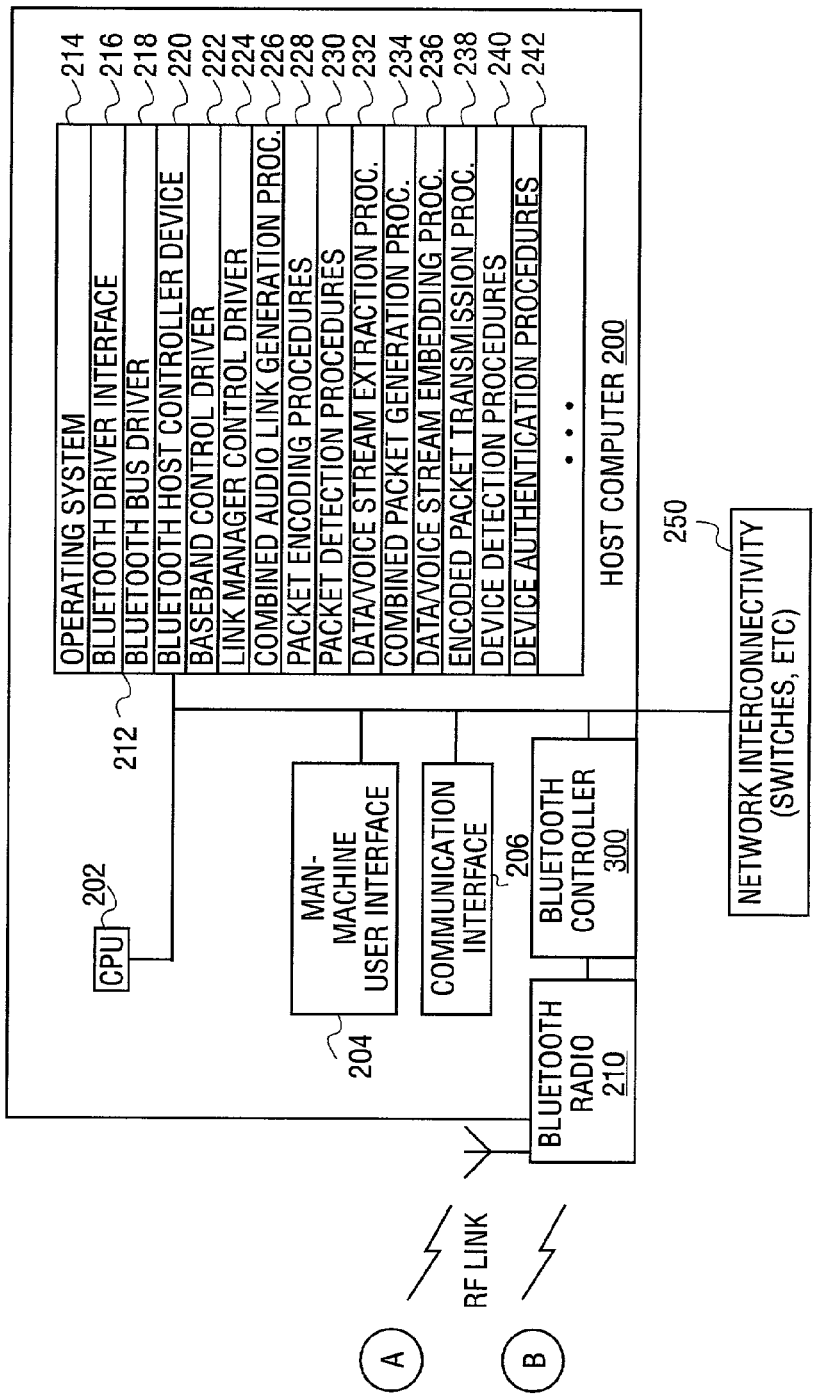
FIG. 2A depicts a block diagram further illustrating the host computer, as depicted in FIG. 1, in accordance with a further embodiment of the present invention.

Referring now to FIG. 2A, FIG. 2A further illustrates the host computer 200, as depicted in FIG. 1, in accordance with a further embodiment of the present invention. As depicted, the host computer 200 includes a CPU 202, a user interface 204, a communications interface 206, as well as a memory 212. However, the host computer 200 is implemented utilizing a Bluetooth™ controller 300, which performs voice channel multiplexing in order to provide multiple audio channels via a single communications link in accordance with one embodiment of the present invention, as described in further detail below.

Figure 2B:
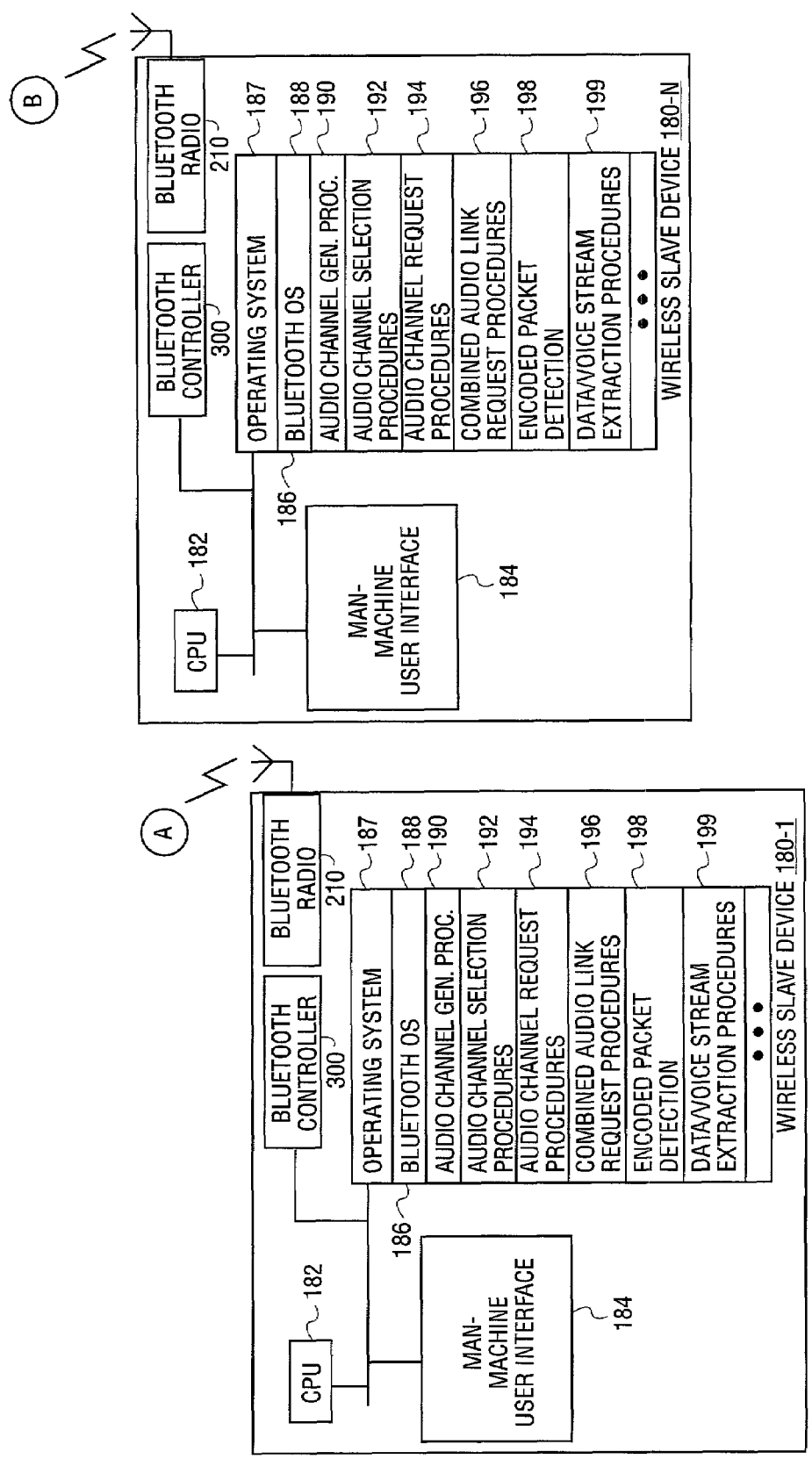
FIG. 2B depicts a block diagram further illustrating the wireless slave device, as depicted in FIG. 1, in accordance with a further embodiment of the present invention.

Although the host computer 200 is illustrated using a Bluetooth™ controller 300, those skilled in the art will recognize that each of the Bluetooth™ enabled devices, such as wireless slave devices 180 (180-1, . . . , 180-N) also include a Bluetooth™ controller 300 and Bluetooth™ radio 310, as depicted in FIG. 2B. Accordingly, the Bluetooth™ enabled slave devices can be utilized by the host device in order to provide communication without the need for interconnected wires between the host computer and Bluetooth™ enabled devices. However, in contrast with conventional Bluetooth™ communication, the slave devices 180 may request additional or combined (multiplexed) audio channels.

In one embodiment, the slave devices enables the user to increase the number of audio sources which are available from the wireless device as additional device audio channels. In addition, as will be described in further detail below, the wireless device, which in one embodiment refers to a headset device, includes a mechanism to enable the user to switch between the various device audio channels provided via the Bluetooth™ system. The channels may be selected by the user and listened to simultaneously or one at a time. Furthermore, the user is provided with the capability to switch between the various channels and select multiple channels for simultaneous voice data via the wireless device 180.

Referring again to FIG. 2A, the memory 212 of host computer 200 may be implemented as RAM (random access memory), SRAM (synchronous random access memory), SDRAM (synchronous data random access memory), flash memory or a combination of RAM and non-volatile memory, such as one or more memory modules, storage volumes or magnetic disk storage units. The memory can contain any of the following, one or more of which are implemented in a Bluetooth™ software stack, as described in further detail below:

operating system 214 running on the host device, which includes for example, Windows Driver Model (WDM) drivers, such as the human interface device (HID) class driver, streaming media Windows Driver Models, as well as network driver interface specifications supported by the Bluetooth™ operating system, such as for example, Winsock™, transmission control protocol (TCP), internet protocol (IP) (TCP/IP);

Bluetooth™ driver interface 216;

Bluetooth™ bus driver 218;

Bluetooth™ host controller device 220;

baseband control driver 222;

link manager control driver 224 configured to implement audio source multiplexing to provide multiple audio sources via a single audio link between a master and a slave device utilizing link manager control procedures, which collectively include procedures 226-242, which is described in further detail below;

combined audio link generation procedures 226 for multiplexing or combining one or more audio sources within an audio link between a master and a slave device to enable the slave device to increase the number of SCO (device) audio channels, which can be provided to a user for simultaneous playback of received audio/data streams, as well as enabling selection of one or more of the device audio channels and providing of the selected device audio channels to the wireless device user;

packet encoding procedures 228 for encoding requested audio sources into a data voice packet, which is decoded by a received wireless slave device in order to receive access to requested, additional audio sources;

packet detection procedures 230 for detecting data voice packets transmitted by a requested audio source device and encoding the intercepted packets within data voice packets to be transmitted to a wireless device via a combined audio link;

data/voice stream extraction procedures 232 for extracting data/voice streams from detected packets using the packet detection procedures 230 and encoding the data/voice streams by providing the data/voice streams to the packet encoding procedures 228;

combined packet generation procedures 234 utilized by the packet encoding procedures for combining packets transmitted by a requested audio source device within packets generated by the host computer, which are transmitted to a requesting wireless device via a combined audio link channel;

packet decoding procedures 228 for decoding packets received via a combined audio link requested by the host computer 200 in order to extract data/voice streams from the received packets;

encoded packet transmission procedures 238 for transmitting encoded packets generated by the packet encoding procedures to the wireless slave device via the combined audio link channel;

device detection procedures 240 for detecting a requested audio source device;

device authentication procedures 242 for authenticating devices detected by the device detection procedures 240; and other procedures and files.

Accordingly, as illustrated by the procedures described above, the host computer 200 not only includes the capability to generate a combined audio link which multiplexes multiple audio sources within the single audio link, but also includes the capability to request combined audio links from a master or host device of an outside piconet. As such, the various master devices within the various piconets may form a scatter net, such that the various host devices may include requests for combining multiple audio sources within combined audio links and provide the multiple sources via the single audio link to requesting wireless slave devices. Utilizing the multiple audio sources received via a single audio link, the requesting wireless devices can generate additional device audio channels which are accessible to a user of the wireless device. In one embodiment, the wireless devices include functionality for switching between the various generated device audio channels for simultaneous listening of the generated device audio channels or selectively listening to one or more device audio channels simultaneously.

Referring now to FIG. 2B, FIG. 2B depicts a plurality of wireless devices 180, such as for example, wireless device 180, as depicted in the Bluetooth™ piconet 100 (FIG. 1). In the embodiment described, the wireless slave devices within the piconet 100 modify the link manager control procedures in order to implement selective switching of device audio channels generated by the slave device 180 in response to user requests. The user requests may be in the form of a voice command or a mechanical switch in order to direct the wireless slave device as to which audio channels the user desires to listen to.

In alternate embodiments, the means for selecting and switching between the device audio channels is not limited to voice commands or mechanical switching and may include, for example, preprogrammed channel selection for static receipt of device audio channels via the wireless headset device or the like. Furthermore, external switching mechanisms can be implemented wherein an external entity controls the audio channel enablement (i.e., a control panel wherein an entity switches the channels for the specific device such as, for example, a sports broadcaster wearing a headset, as described by the present invention, while an entity such as a technician switches the input channels for the sports broadcaster). Accordingly, the wireless slave devices 180 are implemented using a Bluetooth™ controller 300 configured to enable device audio channel selection.

Referring again to FIG. 2B, FIG. 2B illustrates the components of the slave devices 180. As depicted, the wireless slave devices include a CPU 180, a man-machine interface 184, as well as a memory 186. The memory of each wireless slave device may be implemented as RAM, SRAM, SDRAM, flash memory or a combination of RAM and nonvolatile memory, such as one or more memory modules, storage volumes or magnetic disk storage units. The memory can contain any of the following, one or more of which may be implemented utilizing a Bluetooth™ software stack, as described in further detail below:

an operating system 187 running the host device;

Bluetooth™ operating system (OS) 188 for implementing the various Bluetooth™ drivers, as described with reference to the host computer memory 212, as depicted in FIG. 2A;

audio channel generation procedures 190 for generating an audio channel for each audio link established with a master device, such as host computer 200, as depicted in FIG. 2A;

audio channel request procedures 194 for enabling the user to request additional audio channels from one or more requested audio source devices;

combined audio link request procedures 196 for requesting the combined audio link from a host computer, including one or more requested audio source devices to be multiplexed within an audio link between the wireless device 180 and the host computer 200 in order to form a combined audio link;

encoded packet detection procedures 198 for detecting encoded packets received via the combined audio link between the wireless device 180 and the host computer 200 in order to extract packets from both the host computer 200, as well as additional packets encoded within the received packet from one or more audio source devices requested by the user as additional audio channels;

data/voice stream extraction procedures 199 for extracting data voice streams from the received packet and providing the voice streams to the audio channel generation procedures 190 in order to generate additional audio channels for the requested audio channels such that the user may select the additional audio channels via the audio channel selection procedures 192; and other procedures and files.

Accordingly, utilizing the audio channel selection procedures, a wireless device, such as for example, a headset, may listen to various audio sources simultaneously. In addition, the user may select one or more of the audio sources generated as device audio channels by the wireless device headset and listen to the selected channels simultaneously. This is advantageous for, for example, football coaches which desire to listen to multiple audio sources from the sidelines during the game, such as for example, defensive coordinators, offensive coordinators, as well as additional audio sources which may desire to communicate with the individual wearing the audio channel switching wireless device, as described by the present invention. Additionally, this wireless headset device may be utilized to interact with a computer and simultaneously be able to answer telephone calls, cell phone calls or the like within a single headset device.

Figure 3:
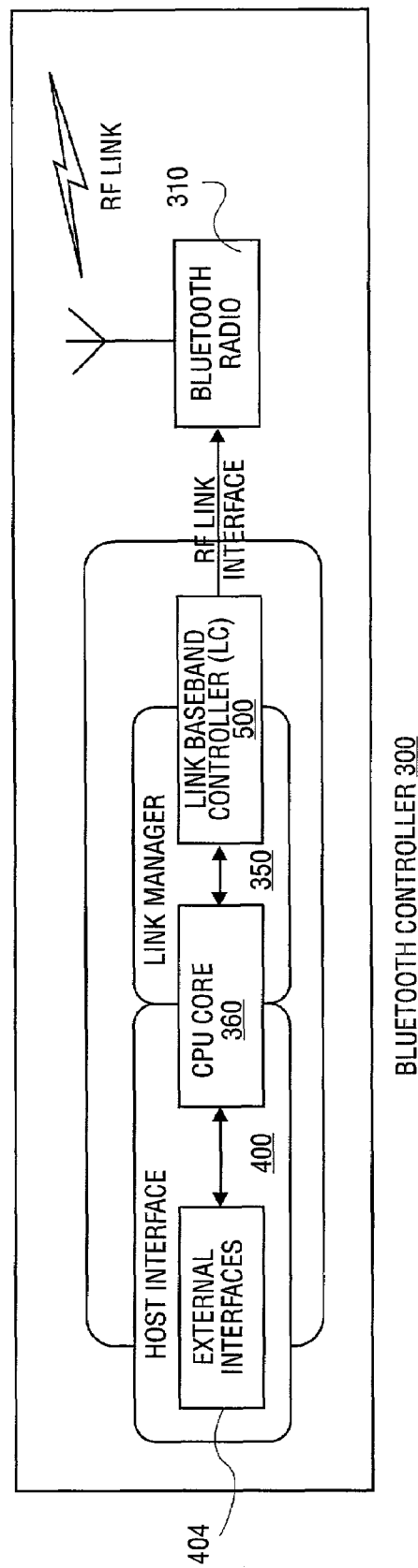
FIG. 3 depicts a block diagram illustrating the controller, as depicted in FIGS. 2A and 2B, in accordance with one embodiment of the present invention.

Referring now to FIG. 3, FIG. 3 further illustrates the Bluetooth™ controller 300, as depicted in FIGS. 2A and 2B, in accordance with a further embodiment of the present invention. As depicted, the Bluetooth™ controller 300 includes an analog portion as the Bluetooth™ radio 310, which is utilized to communicate with the various Bluetooth™ enabled devices, as well as the digital portion, the link controller (Bluetooth™ baseband controller) 500. Accordingly, the Bluetooth™ baseband controller 500 performs the digital signal processing functions of the Bluetooth™ controller 300 using various signal processing hardware. The Bluetooth™ controller 300 further includes a CPU (central processing unit) core 360, which is optional, but is however beneficial, in order to avoid interface problems with a personal computer CPU. The CPU core 402 is further utilized to interface between external interfaces 404, which provide a host interface 400 to the various additional devices of the host computer 200.

As such, the baseband controller 500 includes hardware for performing baseband processing and basic protocols close to the physical layer, such as for example, ARQ (automatic request repeat) protocol and FEC (forward error control) coding. Hence, the baseband controller 500 incorporates all hardware required to interface the Bluetooth™ controller 300 to the Bluetooth™ radio environment. Generally, command responses and data are transferred between Bluetooth™ units across the radio interface in packet format. In addition, the baseband controller 500 is generally responsible for quality of service parameters, asynchronous transfers with guaranteed delivery, synchronous transfers audio coding and encryption.

Referring again to FIG. 3, the link manager 350 is a software entity which carries out protocols, such as link set-up, device initialization, authentication, link configuration and the like. The link manager 350 discovers other remote link managers and communicates with them via the link management protocol (LMP) to perform service provider role and uses the services of the underlying baseband controller 500. The service provided includes name requests, which may be up to 16 characters in length, link address inquiries, connection set-up, authentication, link mode negotiation and set-up, such as for example, data or data invoice, setting devices in sniff mode, hold mode, park mode and active mode.

Figure 4:
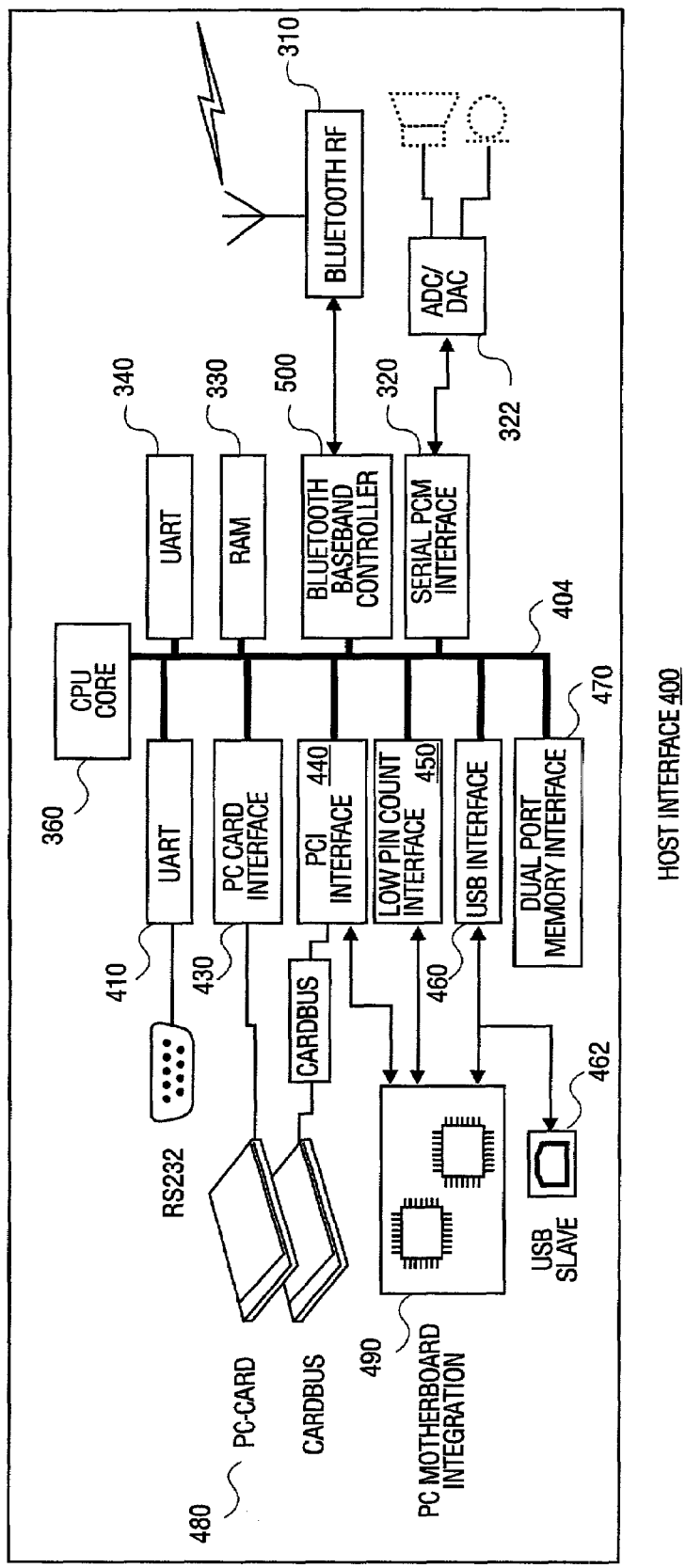
FIG. 4 depicts the host interface, as depicted in FIG. 3, in accordance with the further embodiment of the present invention.

Referring now to FIG. 4, FIG. 4 depicts host interface 400, as depicted in FIG. 3, in accordance with one embodiment of the present invention. The host interface (HIF) 400 includes hardware and software, which interfaces the Bluetooth™ controller 300 to a host, such as for example, host device 200, as depicted in FIG. 2. The primary function of HIF 400 is to provide services of the lower layers (via the link manager) in a format suitable for the host device.

Accordingly, the various external interfaces are depicted in FIG. 4, which may include for example, PC card interface 430, PCI (peripheral component interconnect interface 440, low pin out pin count interface 450, USB interface 460 and dual port memory interface 470. These devices may implement and support PC card bus RS 232, PC mother board integration, as well as USB slave 462. As such, the Bluetooth™ controller firmware implements the baseband link management protocol. The drivers control the radio 310 using the Bluetooth™ host controller interface 400, which is accessed through an appropriate transport interface, as will be described in further detail below.

Software Architecture

Figure 5:
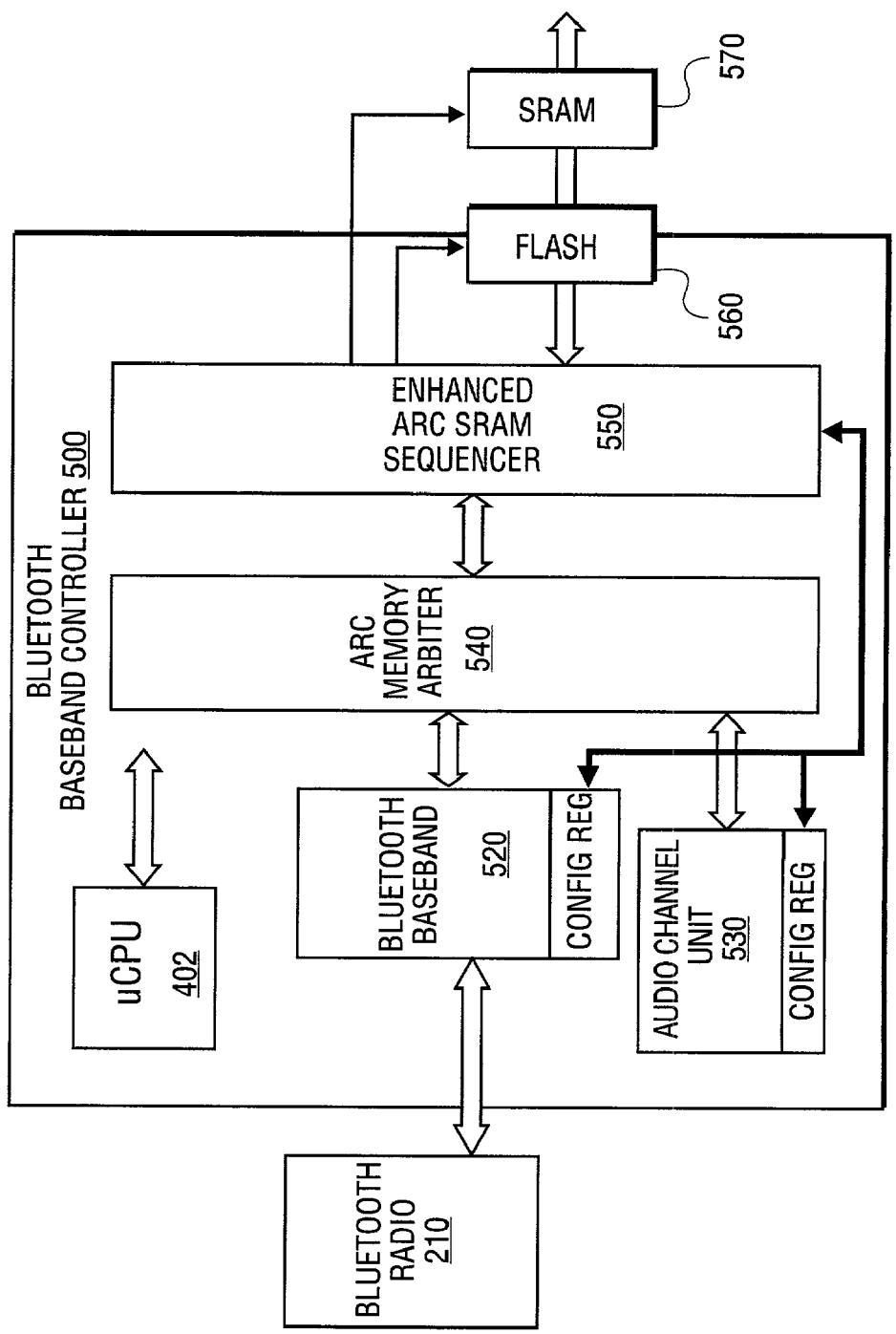
FIG. 5 depicts a block diagram further illustrating the baseband controller, as depicted in FIG. 3, in accordance with the further embodiment of the present invention.

Referring now to FIG. 5, FIG. 5 further illustrates the Bluetooth™ baseband controller, as depicted in FIG. 4. The Bluetooth™ baseband controller 500 includes a processor 360 along with memory arbiter 540, SRAM sequencer 550, flash memory 560 and SRAM 570. However, in contrast to conventional baseband controllers, the Bluetooth™ baseband controller 500 includes audio channel unit 530, which baseband 220 utilizes in order to request combined audio links for increasing the number of device audio channels available to a user as well as multiplexing of multiple audio sources with a single audio link to form requested, combined audio link. Accordingly, the Bluetooth™ baseband 520 includes firmware for performing the audio channel selection and audio source multiplexing functionality of link manager driver procedures, as depicted in FIGS. 2A and 2B, at the baseband level.

The software architecture for implementing Bluetooth™ devices is based on the concept of treating the short range radio, such as for example, Bluetooth™ RF 310, as depicted in FIGS. 2-4, as a bus driver. Treating the local radio 310 as a bus controller enables the loading of appropriate device drivers on detection and identification of other Bluetooth™ compliant devices within range. As such, Bluetooth™ devices fall under the following three classes—telephone related devices, traditional PC peripherals and communication/network devices.

In order to support Bluetooth™ peripherals, the Bluetooth™ software model utilizes the windows driver model (WDM) human interface (HID) class driver. The HID class driver comes standard from, for example, Microsoft's NT™ 5.0 and 98 operating systems, and provides support for all human interface devices, such as bus list mechanisms. The HID driver is capable of identifying the HID peripheral and loading the corresponding HID mini drivers in a way that is bus independent. The HID class driver must be pointed to a WDM bus driver. Accordingly, by means of the Bluetooth™ WDM bus driver and an HID to Bluetooth™ bus mini driver, the HID class driver can be used to support all human interface devices, such as mice, keyboard, joysticks or the like.

Support for real time voice has been implemented using digital audio hooks in the PC via the streaming media Windows driver model (WDM) defined by Microsoft Corporation of Redmond, Washington. In addition, the network driver interface specification has connection orientation channels at the (NDIS) layer, which targets telephone applications. Finally, in networking applications are implemented by utilizing the Bluetooth™ controller interface as a network interface card (NIC), utilizing a mini driver to interface the NDIS class driver with the Bluetooth™ WDM bus driver. One skilled in the art will recognize that implementations within other operating environments can be accomplished with the appropriate layering of device drivers, middle-ware, and applications, all within conformance to the Bluetooth™ software specifications.

Figure 6:
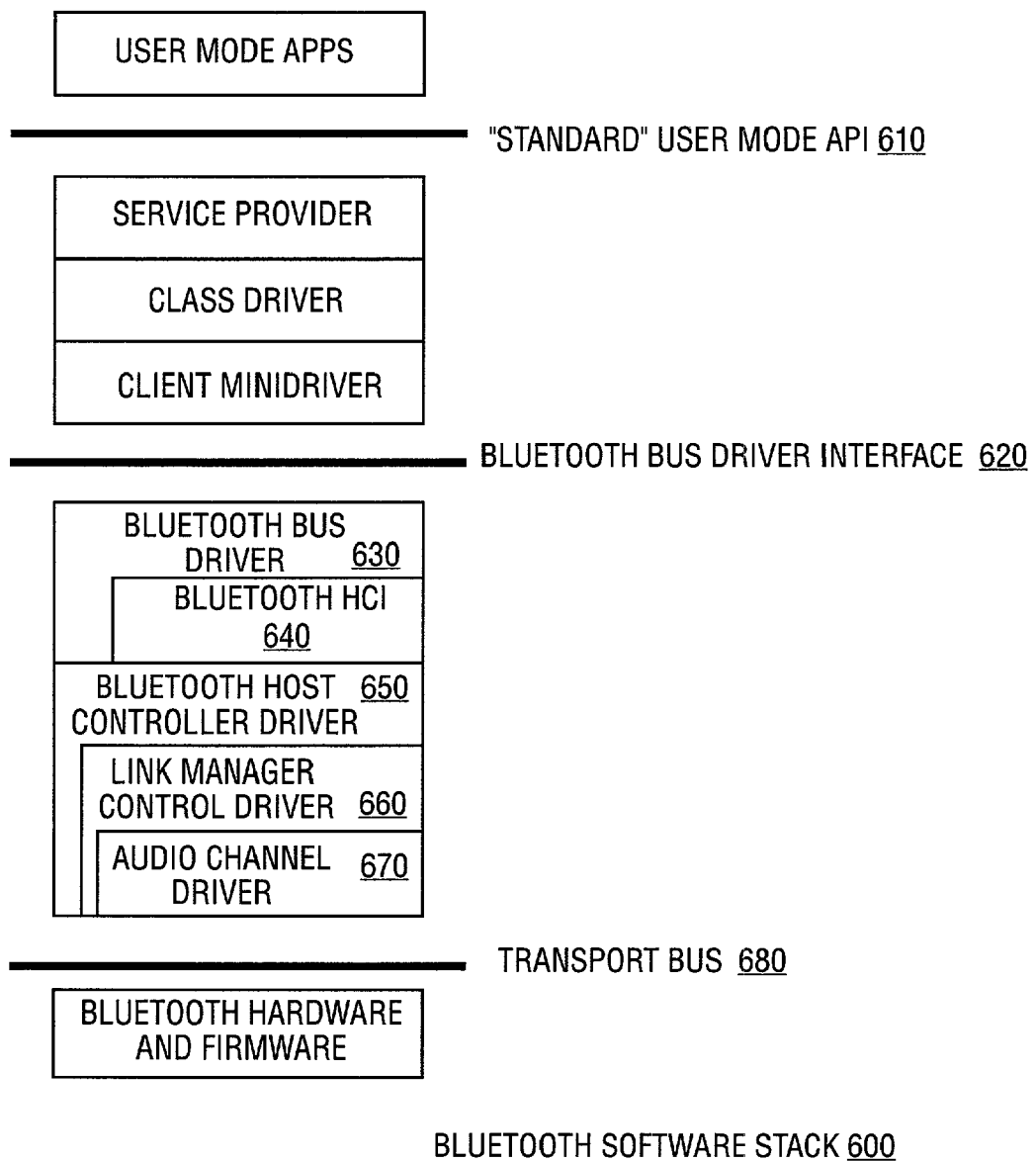
FIG. 6 depicts a software stack implementing a linked manager control driver to provide an audio channel switching wireless device, as well as audio channel multiplexing, to form combined audio links, in accordance with an exemplary embodiment of the present invention.

Referring now to FIG. 6, FIG. 6 depicts the Bluetooth™ software stack 600. As illustrated, the core of the Bluetooth™ software stack 600 essentially includes the Bluetooth™ bus driver 630, the Bluetooth™ host control interface (HCI) 640 and the Bluetooth™ host controller driver 650. Accordingly, each function class typically includes a client driver that is loaded by the Bluetooth™ bus driver. These client drivers utilize the Bluetooth™ bus driver interface 620 to communicate with the Bluetooth™ bus driver 630 for data and control transfer purposes.

However, in contrast to conventional Bluetooth™ software stacks, Bluetooth™ software stack 600 includes a Bluetooth™ or link manager control driver 660, which is utilized to implement the device audio channel switching, as well as the audio source multiplexing to provide additional audio beyond the number available from conventional Bluetooth™ Radio System, as described herein. However, those skilled in the art will recognize that the audio channel switching and multiplexing methods described herein may be implemented anywhere within the Bluetooth™ bus driver interface 620 software stack 600, as well as within the Bluetooth™ controller firmware, depending on the desired implementation specific details of the system designer.

Accordingly, as illustrated in FIGS. 2A and 2B, within the memory of the host device 200 and wireless slave devices, the link manager control driver procedures 222 enable a wireless slave device, such as for example, a Bluetooth™ enabled headset, which is configured to allow users to switch between a plurality of device audio channels available to the user. As such, the user may request, via for example, voice or mechanical means, one or more device audio channels to be simultaneously provided to the headset device and provided to the user.

In addition, host devices, such as host computer 200 as depicted in FIG. 2A, include functionality to enable Bluetooth™ headset devices to provide users with additional device audio channels by requesting combined audio links from the host computer 200. As such, the host computer will contain an audio link between the host computer and the requesting Bluetooth™ headset device. Using this audio link, the host computer will multiplex audio sources from one or more audio source devices within the single audio link to form a combined audio link. In one embodiment, this is performed by encoding or embedding packets transmitted from the one or more requested audio source devices within packets generated by the host computer 200 for communication via the audio link between the host computer 200 and the wireless device 180.

Accordingly, the request from the wireless device will generally indicate one or more audio source devices to be multiplexed into the audio link between the wireless device and the host computer 200 in order to generate the combined audio link. As such, the wireless device will include functionality for detecting voice/data streams from the requested audio source devices, as well as voice/data streams transmitted by the host computer. Once detected, the voice streams are extracted and provided via device audio channels generated by the wireless device. These channels are available to the user and provide the capability to include a plurality of device audio channels beyond the limits prescribed by the conventional Bluetooth™ Radio System.

Figure 7:
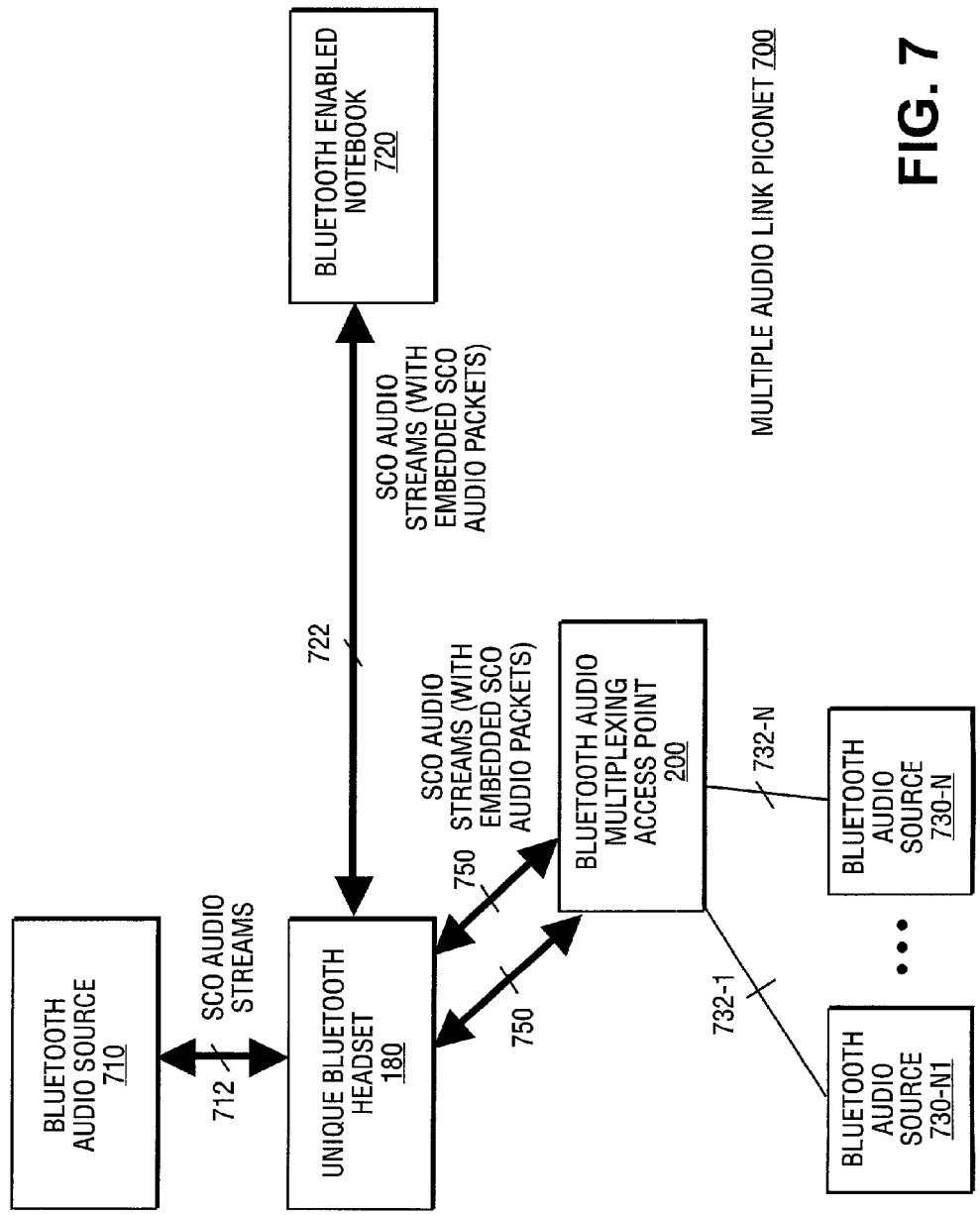
FIG. 7 depicts a multiple audio link piconet in accordance with a further embodiment of the present invention.

Referring now to FIG. 7, FIG. 7 depicts a multiple audio link piconet 700 utilizing host computer 200, as depicted in FIG. 2A, as well as wireless slave device 180, as depicted in FIG. 2B. In the embodiment described, the wireless slave device 180 is configured as a Bluetooth™ headset. Accordingly, the Bluetooth™ headset includes audio links with Bluetooth™ audio source 710, as well as Bluetooth™ enabled notebook 720. In the embodiment described, the headset 180 also includes an audio link with host computer 200 implemented as a Bluetooth™ audio multiplexing access point. In the embodiment described, the user of the Bluetooth™ headset 180 may simultaneously listen to voice/data streams received from the Bluetooth™ audio source 710, the Bluetooth™ enabled notebook 720 and the access point 200. The multiplexing function of the access point 200 can be accomplished in a unique Bluetooth™ device configured to perform channel multiplexing, or alternatively the channel multiplexing defined herein may be incorporated into any existing Bluetooth™ device to perform this multiplexing functionality.

Alternatively, the user may select a single stream or a combination of the streams as desired. This functionality is provided via the audio channel request procedures and combined audio link request procedures described with reference to FIG. 2B. However, when the user desires additional audio channels beyond the three SCO audio channel limit prescribed by the Bluetooth™ specification, the user may request additional audio channels via the Bluetooth™. In response to such requests, the Bluetooth™ headset will request that the audio link 750 between the headset 180 and the access point 200 is configured into a combined audio link. In addition, the request will include one or more audio source devices, such as for example, Bluetooth™ audio source 730 (730-1, . . . , 730-N).

Accordingly, the access point 200 will utilize its link manager control procedures, or firmware, in order to establish audio links with the requested Bluetooth™ audio sources 730. Once the audio links are generated, the Bluetooth™ access point 200 will multiplex voice/data streams from the requested audio sources 730 into the audio link 750 provided to the headset device. In one embodiment, this is performed by detecting packets transmitted by the requested audio sources 730 and embedding the requested packets within packets utilized by the access point to communicate voice stream data to the Bluetooth™ headset. This embodiment is described with reference to FIG. 7.

Alternatively, the voice stream data is simply multiplexed via time slots or the like within the various audio links 750. As such, the wireless headset is responsible for detecting the multiplexed voice/data streams from the requested audio source devices, as well as the access point 200. Once detected, the voice/data streams are provided via additional audio channels, which may be selected by the user along with audio links 712, 722 for simultaneous or individual listing by the headset user.

Figure 8:
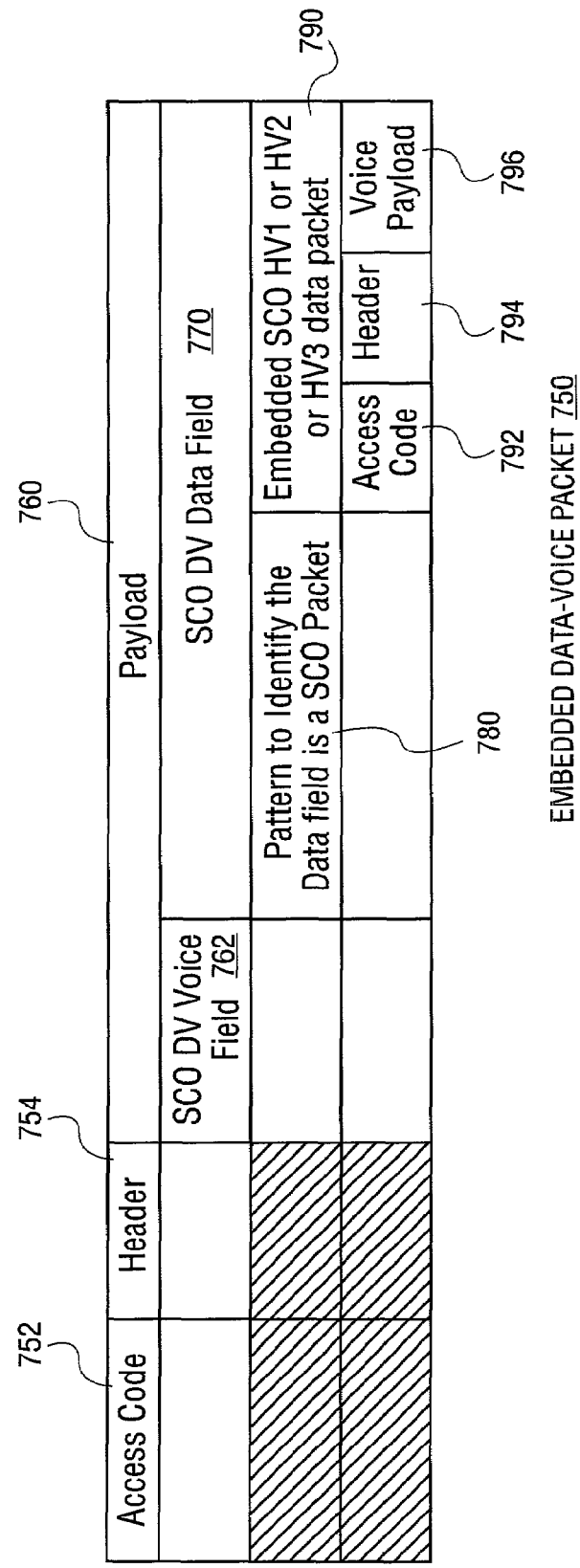
FIG. 8 depicts an embedded data voice packet generated by a host device in response to a request for additional device audio channels and in accordance with a further embodiment of the present invention.

Referring now to FIG. 8, FIG. 8 depicts an embodiment of audio source multiplexing wherein the access point 200 detects packets transmitted by requested audio sources 730. In the embodiment described, the combined audio link is limited to containing audio sources from the access point 200, as well as a selected requested audio source device. However, those skilled in the art will recognize that the data voice packet depicted in FIG. 8 may include a plurality of embedded data voice streams from one or more requested audio source devices. As such, embedded data voice packet 750 is provided for illustration purposes and should not be interpreted in a limiting sense.

Referring again to FIG. 8, FIG. 8 depicts an embedded data voice packet 750. As known to those skilled in the art, the data voice packet is utilized by the Bluetooth™ Radio System to transmit a combination of data invoice information. However, voice data is generally transmitted using high quality voice (HV) packets, which include HV1, HV2 or HV3 data packets. HV packet 1 (high quality voice) is a pure voice packet. It contains 10 voice bytes representing 1.25 milliseconds worth of speech. In the HV1 packet, the 10 voice bytes are protected with a one-third rate forward error control code. The payload length is fixed and is 240 bytes. In addition, an HV packet has to be sent every two time slots.

The HV2 packet is also a pure voice packet. It contains 20 voice bytes, representing 2.5 milliseconds worth of speech. The 20 bytes are protected with a ⅔ rate forward error control code (FEC). The payload length is fixed at 240 bytes; however, since the HV2 packet contains 2.5 seconds worth of speech, only one HV2 packet has to be transmitted every four time slots. The HV3 packet is also a pure voice packet. It contains 30 voice bytes, representing 3.75 microseconds worth of speech. The 30 bytes are not protected by a forward error control code, while the payload length is fixed at 240 bytes. However, since the HV3 packet contains 3.75 microseconds worth of speech, only one HV3 packet has to be transmitted every six time slots.

Finally, the data voice (DV) packet, for example as depicted in FIG. 8, is a combined data-voice packet. The payload 760 is divided into a voice field 762 of 80 bits and a data field 770 containing up to 150 bits. The 10 voice bytes contain 10 PCM samples (1.75 microseconds worth of speech). The voice field is not protected by a forward error control code. In contrast, the data field contains up to 10 information bytes (including the one byte payload header). Added to the information bytes of the 16 bit cyclic redundancy code (CRC), information in CRC bits are encoded with the two/thirds rate FEC. Tail bits are added to assure the total number of payload bits is a multiple of ten prior to FEC encoding.

Since the DV packet has to be sent at regular intervals due to its synchronous voice (contents), a DV packet is similar to the SCO packet types. The voice and data fields are treated completely separately. The voice field is routed to the synchronous I/O port and never transmitted. The voice field is always new. The data field is part of an ACL link and is checked for errors and re-transmitted if necessary. The data field is routed to the asynchronous I/O connection port according to the Bluetooth™ Systems Specification.

However, in contrast to conventional data voice packets, the combined data voice packets 750 provides the capability to multiplex additional voice channels into the data fields by subdividing the data fields into separate/special voice-data streams. The data voice packet will contain, in the data portion, a pattern to identify that the data field is an embedded SCO packet. As such, the various type of HV packet will be indicated in portion 790 of the data voice packet. In addition, this portion will include an access code 792, a header 794 and a voice payload 796. Accordingly, a requesting wireless slave device of the embedded data voice packet 750 will examine the data field to determine the data type 770 (whether it is real data or multiplexed voice stream data. Accordingly, once the wireless slave device reaches the three SCO channel limit, the packets used for transmission on the link can be switched to data voice packets and an additional audio sources can be packed into the data field of each data voice packet for a resulting six audio channels. However, such additional virtual audio channels may be provided depending on the compression of the audio data to include a plurality of multiplexed voice streams.

In the embodiment described, the additional voice stream encoded into the data field of embedded data voice packet 750 is formatted as an additional SCO packet (HV1, HV2, or HV3). According to this embodiment, the receiving wireless device will simply extract the embedded SCO packet out of embedded data voice packet 750 and provide the extracted packet to an SCO packet handler in order to provide extracted data voice streams to a user via a requested audio channel.

In other words, a unique headset, configured in accordance with the teachings of the present invention, checks all received SCO DV packets for additional SCO audio packets within the data field 770 of the data voice packet. An audio device, such as a notebook computer or a special Bluetooth™ access point, can establish a Bluetooth™ connection to this unique Bluetooth™ headset. Once the headset reaches the three SCO channel limits specified by the Bluetooth™ Radio System, the device will receive a rejection of the attempts to set-up a new SCO channel to the unique headset.

Accordingly, if the second device desires to send additional audio streams that embeds the additional audio streams into an SCO HV packet into the data field of an SCO DV packet. If the initial stream started out using SCO packets, the center can shift over to use data voice packets on the fly. In summary, multiplexed audio streams are created by a sender, who has already established a single SCO connection. The maximum number of clients this wireless headset can be up to three, but can receive more audio streams using this embedded technique to create virtual SCO channels. If a Bluetooth™ access point is used, this access point can act to multiplex embedded audio streams using its SCO channels. Procedural methods for implementing the teachings of the present invention are now described.

Operation

Figure 9:
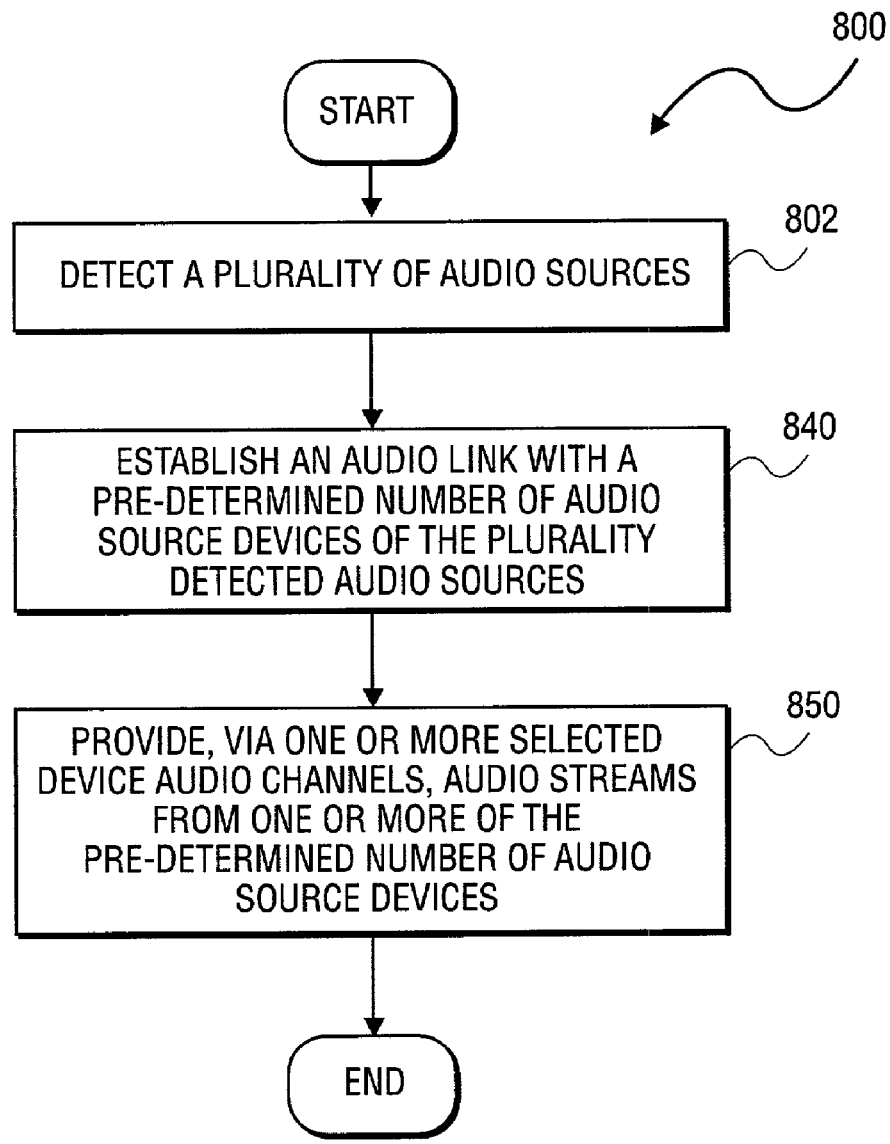
FIG. 9 depicts a flowchart illustrating a method for audio channel switching within a wireless device, in accordance with one embodiment of the present invention.

Referring now to FIG. 9, FIG. 9 depicts a method 400 for providing audio channel switching in response to user requests for simultaneously providing one or more selected device audio channels to a user via a wireless device, such as for example, a wireless headset device, as depicted in FIGS. 2B and 6. At process block 802, a wireless device detects a plurality of audio sources within communications range of the wireless device. Once detected, at process block 840, the wireless device establishes an audio link with a predetermined number of audio source devices of the plurality of detected audio sources. Finally, at process block 850, the wireless device provides, via one or more device audio channels selected by the user, audio streams from one or more of the predetermined number of audio source devices. In one embodiment, method 800 is implemented utilizing audio channel selection procedures 190, as well as audio channel generation procedures 190, as depicted in FIG. 2B, to enable the user to simultaneously listen to one or more audio source devices via the wireless device 180.

Figure 10:
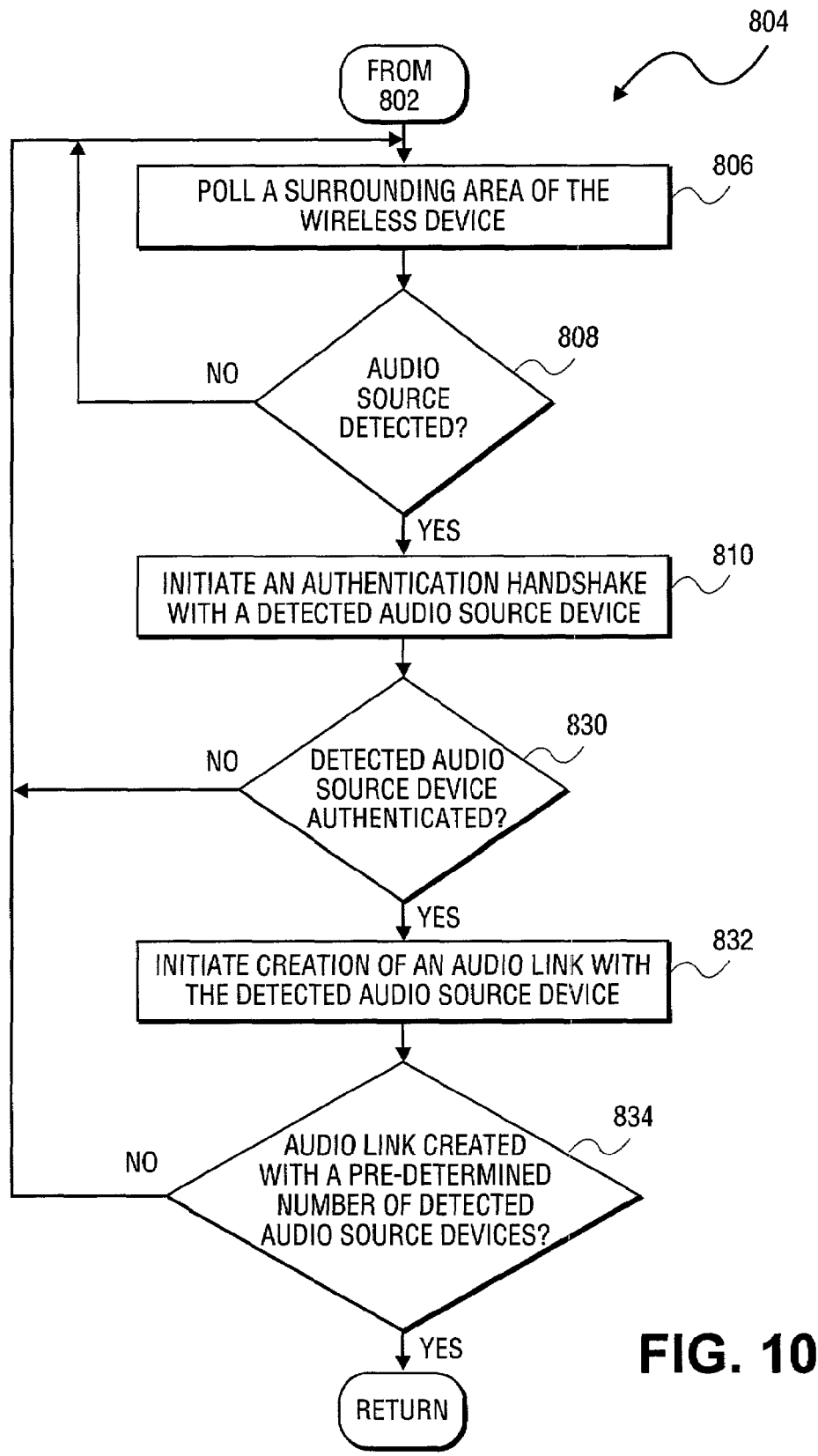
FIG. 10 depicts a flowchart for detecting audio source devices within communications range of a wireless device, in accordance with a further embodiment of the present invention.

Referring now to FIG. 10, FIG. 10 depicts a flowchart illustrating an additional method 804 for detecting the plurality of audio sources of process block 802, as depicted in FIG. 9. At process block 806, the wireless device polls a surrounding area for audio sources within communications range of the wireless device. Next, at process block 808, process block 806 is repeated until an audio source is detected. Once detected, at process block 810, the wireless device initiates an authentication handshake with a detected audio source device. Next, at process block 830, it is determined whether the detected audio source device is authenticated. Accordingly, process blocks 806-810 are repeated until a detected audio source device is authenticated. Once authenticated, the wireless device initiates creation of an audio link with a detected audio source device.

Finally, at process block 834, process blocks 806-832 are repeated until an audio link is created with a predetermined number of detected audio source devices. As described above, the predetermined number of detected audio sources is generally limited to three audio sources in accordance with the Bluetooth™ Radio System specification. However, utilizing the audio channel request procedures 194 and combined audio link request procedures 196, a user of the wireless device 180 can select a plurality of additional virtual audio channels beyond the three audio channel limited specified by the Bluetooth™ radio specification.

Figure 11:
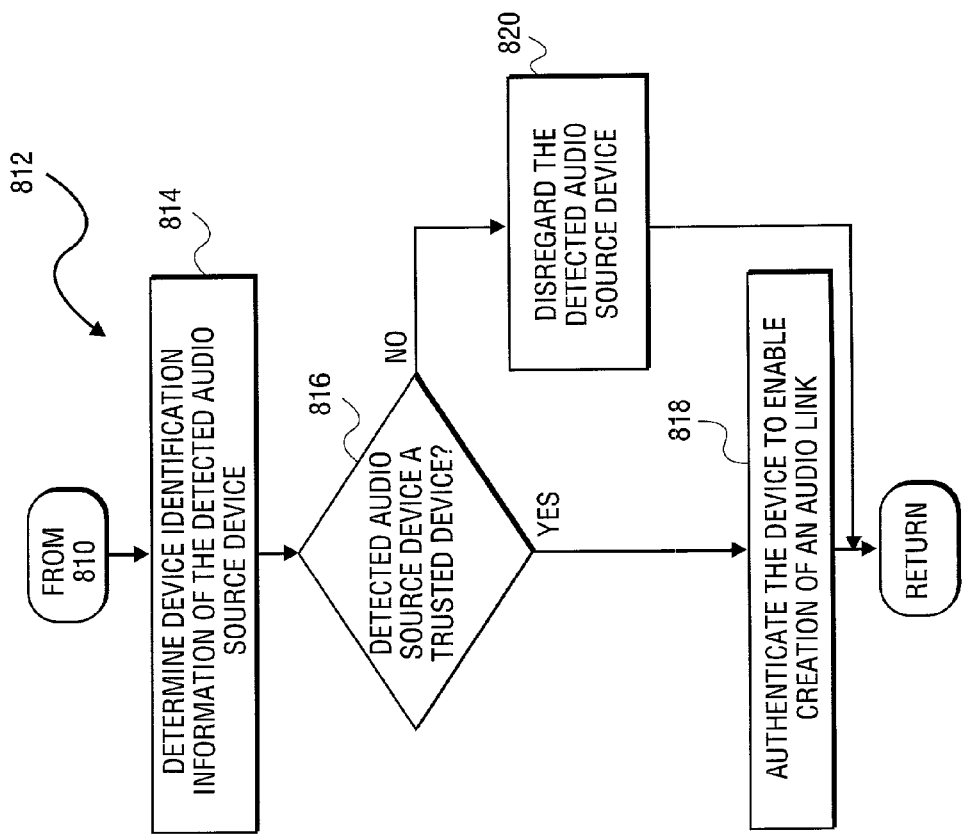
FIG. 11 depicts a flowchart illustrating an additional method for authenticating detected wireless devices in accordance with a further embodiment of the present invention.

Referring now to FIG. 11, FIG. 11 depicts an additional method 812 for initiating an authentication handshake with a detected audio source device of process block 810, as depicted in FIG. 10. At process block 814, the wireless device 180 determines device identification information of the detected audio source device. Next, at process block 816, it is determined whether the detected audio source device is a trusted audio source device. When the device is untrusted, at process block 820, the wireless device disregards the detected audio source device. Otherwise, at process block 810, the wireless device authenticates the device to enable creation of an audio link between the wireless device and the detected audio source device.

Figure 12:
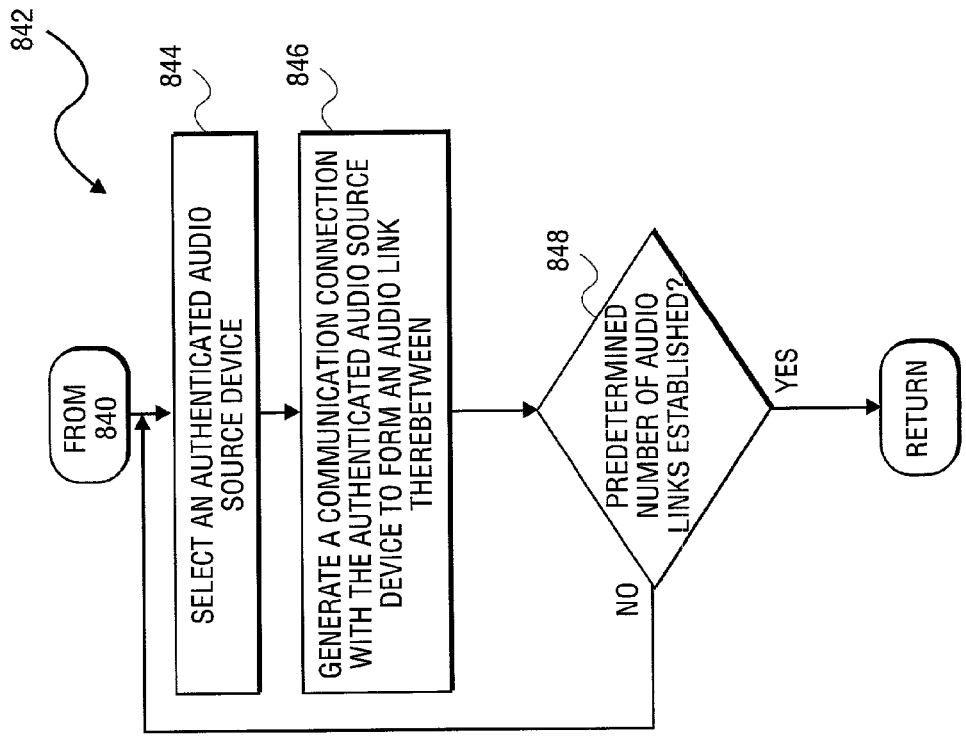
FIG. 12 depicts a flowchart illustrating an additional method for establishing an audio link with detected wireless devices in accordance with a further embodiment of the present invention.

Referring now to FIG. 12, FIG. 12 depicts an additional method 842 for establishing an audio link with a predetermined number of detected audio source devices of process block 840, as depicted in FIG. 9. At process block 844, the wireless device selects an authenticated audio source device. Next, at process block 846, the wireless device generates a communication connection with the authenticated audio source device to form an audio link therebetween. Finally, at process block 848, process blocks 844-846 are repeated until a predetermined number of audio links are established. As described above, the predetermined number of audio links is limited to three SCO audio links, as prescribed by the Bluetooth™ Radio specification. However, as described in detail below, one embodiment of the present invention enables the user to select additional virtual audio channels, which are provided via a host device.

Figure 13:
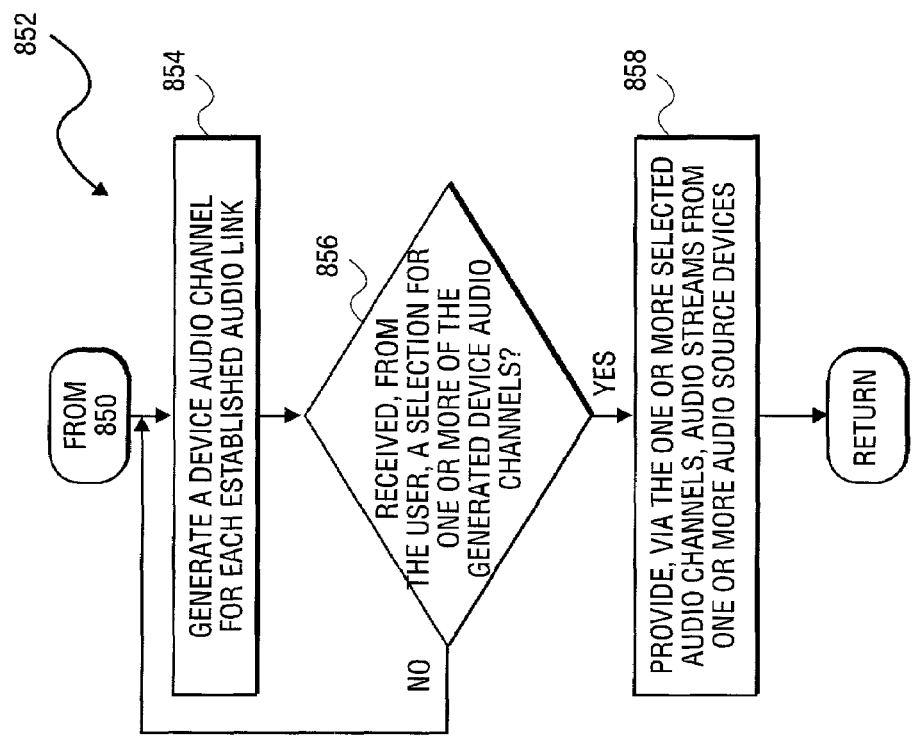
FIG. 13 depicts a flowchart illustrating an additional method for receiving audio channel selection from a wireless device user in accordance with a further embodiment of the present invention.

Referring now to FIG. 13, FIG. 13 depicts a flowchart illustrating an additional method 852 for providing selected device audio channels and respective audio streams therefrom to a user of a wireless device of process block 850, as depicted in FIG. 9. At process block 854, the wireless device generates a device audio channel for each established audio link with a detected audio source device, utilizing for example, the audio channel generation procedures 190. Next, at process block 856, the wireless device determines whether it receives a user selection for one or more of the generated device audio channels. Once selection is received, at process block 858, the wireless device provides, via the one or more selected audio channels, audio streams from one or more audio source devices.

As described above, the audio channel generation procedures 190, as well as audio channel selection procedures, enable the user to simultaneously listen to one or more selected device audio channels and also enable the user to add additional audio channels and remove additional audio channels, which are provided via the wireless device. In one embodiment, the switching between the various channels is provided via a mechanical means. However, in alternative embodiments, switching between the various channels may be provided via voice commands, which are interpreted via voice recognition software provided by the link manager control procedures within the audio channel selection procedures 192.

Figure 14:
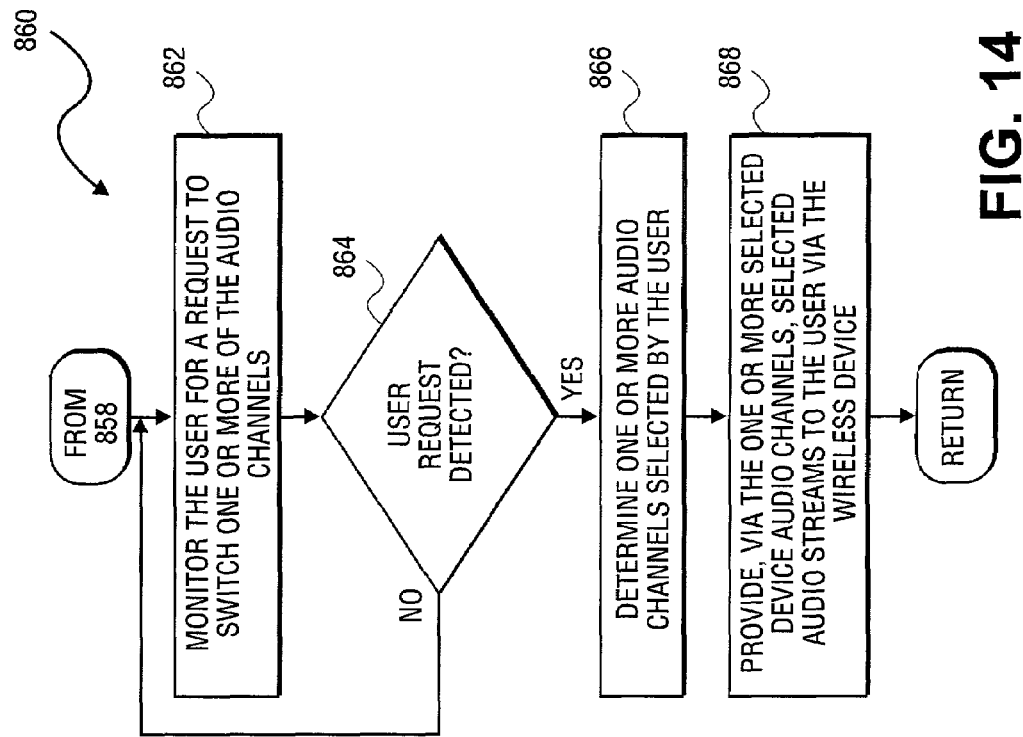
FIG. 14 depicts a flowchart illustrating an additional method for switching between requested device audio channels in accordance with a further embodiment of the present invention.

Referring now to FIG. 14, FIG. 14 depicts a flowchart illustrating an additional method 860 for providing audio streams via selected audio channels at process block 858, as depicted in FIG. 13. At process block 852, the wireless device monitors the user for a request to switch one or more of the device audio channels, utilizing for example, the audio channel selection procedures 192. Once a user request is detected at process block 864, process block 866 is performed. At process block 866, the wireless device determines one or more audio channels selected by the user, utilizing the audio channel selection procedures 192. Finally, at process block 868, the wireless device provides, via the one or more selected device audio channels, selected audio streams to the user via the wireless device.

Figure 15:
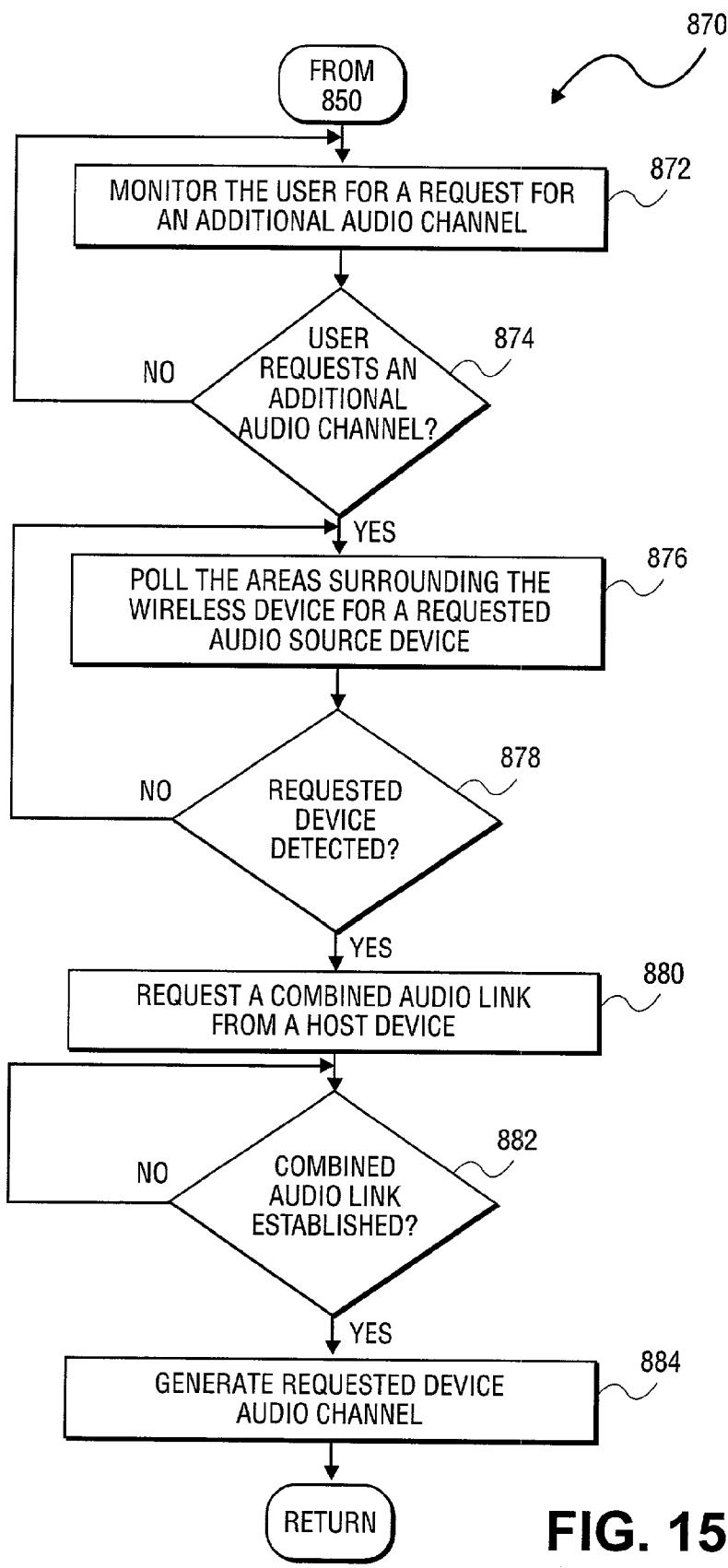
FIG. 15 depicts a flowchart illustrating an additional method for generating requested device audio channels in response to a user selection and in accordance with a further embodiment of the present invention.

Referring now to FIG. 15, FIG. 15 depicts a flowchart illustrating an additional method 870 for providing audio streams via one or more selected audio channels of process block 850, as depicted in FIG. 9. At process block 872, the wireless device 180 monitors the user for a request for an additional audio channel. At process block 874, process block 872 is repeated until a user request for an additional audio channel is received by the wireless device. Once received, at process block 876, the wireless device will poll the area surrounding the wireless device for an audio source device requested by the user. Accordingly, at process block 878, process block 876 is repeated until the requested device is detected. Once detected, at process block 880, the wireless device requests a combined audio link from a host device having an established audio link with the wireless device.

In one embodiment, process block 880 is performed utilizing the combined audio link request procedures 196 in response to the audio channel request procedures 194 invoked by the user when requesting additional audio channels. As such, the audio channel request procedures 194 will include one or more requested audio source devices which the user desires to receive audio streams from. Once these devices are detected, the wireless device 180 will request a combined audio link from a host device 200 utilizing combined audio link request procedures 196. Next, at process block 882, it is determined whether the combined audio link is established by the host device 200. Once the combined audio link is established by the host device 200, the wireless device 180 generates additional requested device audio channels for each requested audio source device indicated by the wireless device user.

Figure 16:
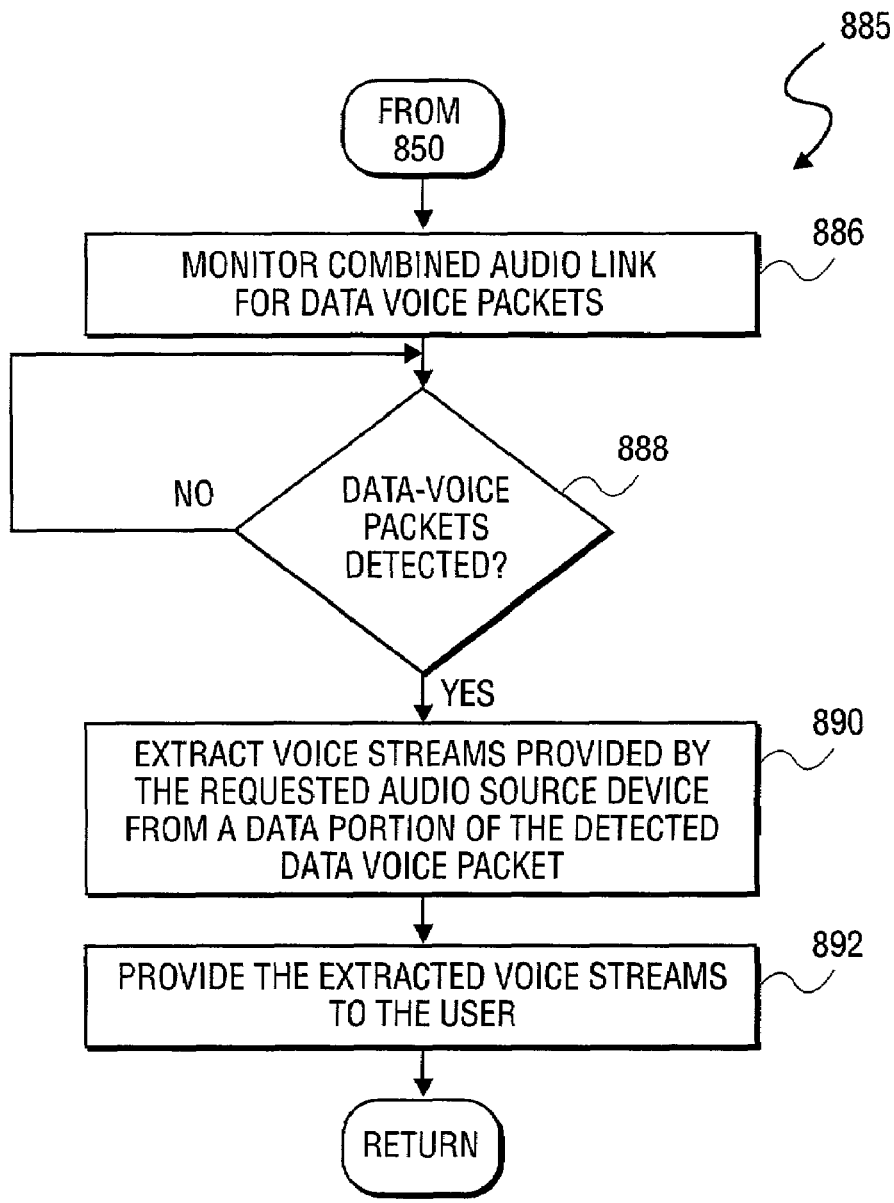
FIG. 16 depicts a flowchart illustrating an additional method for decoding received packets in order to extract voice streams from one or more requested additional audio source devices in accordance with a further embodiment of the present invention.

Referring now to FIG. 16, FIG. 16 depicts a flowchart illustrating an additional method 885 for providing audio streams via one or more selected audio channels of process block 850, as depicted in FIG. 9. At process block 886, the wireless device 180 monitors the combined audio link for multiplexed data voice packets. At process block 888, process block 886 is repeated until the multiplexed, or data voice packet, is detected. In the embodiment described, a host device will embed or multiplex voice/data streams from the one or more audio source devices requested by the user and embed the voice streams within packets utilized by the host computer 200 to provide voice streams to the wireless device 180.

Accordingly, once a data voice packet is detected, at process block 890, the wireless device extracts voice streams provided by the requested audio source devices from a data portion of the detected data voice packet. Once extracted, the voice streams are provided to the user via additional audio channels requested by the user. In one embodiment, method 885 is performed utilizing the encoded packet detection procedures 189, as well as data voice stream extraction procedures 199, to provide the device user with additional virtual channels beyond the three SCO channel limit prescribed by the Bluetooth™ System Specification while remaining in compliance with Bluetooth™ definitions.

Figure 17:
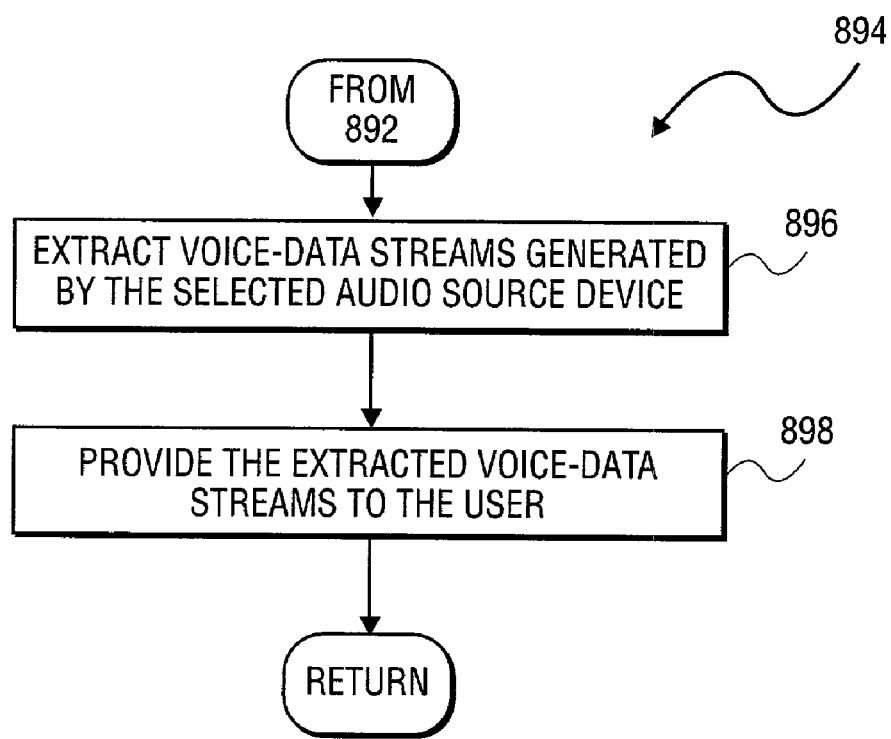
FIG. 17 depicts a flowchart illustrating an additional method for extracting voice streams from one or more encoded packets received via a requested combined audio link in accordance with the further embodiment of the present invention.

Referring now to FIG. 17, FIG. 17 depicts an additional method 994 for providing extracted voice streams to the user. At process block 896, the wireless device 180 extracts the voice data stream generated by a selected audio source device. In the embodiments described, the selected audio source device refers to the host device from which the combined audio link is requested. Accordingly, once the data streams generated by the selected audio source device are extracted, at process block 898, the voice data streams are provided to the user. As such, methods 885 and 894, as depicted in FIGS. 16 and 17, enable the wireless device to extract voice data streams received from the requested audio source devices, as well as the initial selected audio source device, or host device, and generate respective device audio channels for each received voice/data stream, which are provided to the user. Accordingly, the user can select the additional requested audio channels for simultaneous listening, via the wireless device, and can thereby establish a relatively unlimited number of device audio channels beyond the three SCO audio channel limit prescribed by the Bluetooth™ System Specification.

Figure 18:
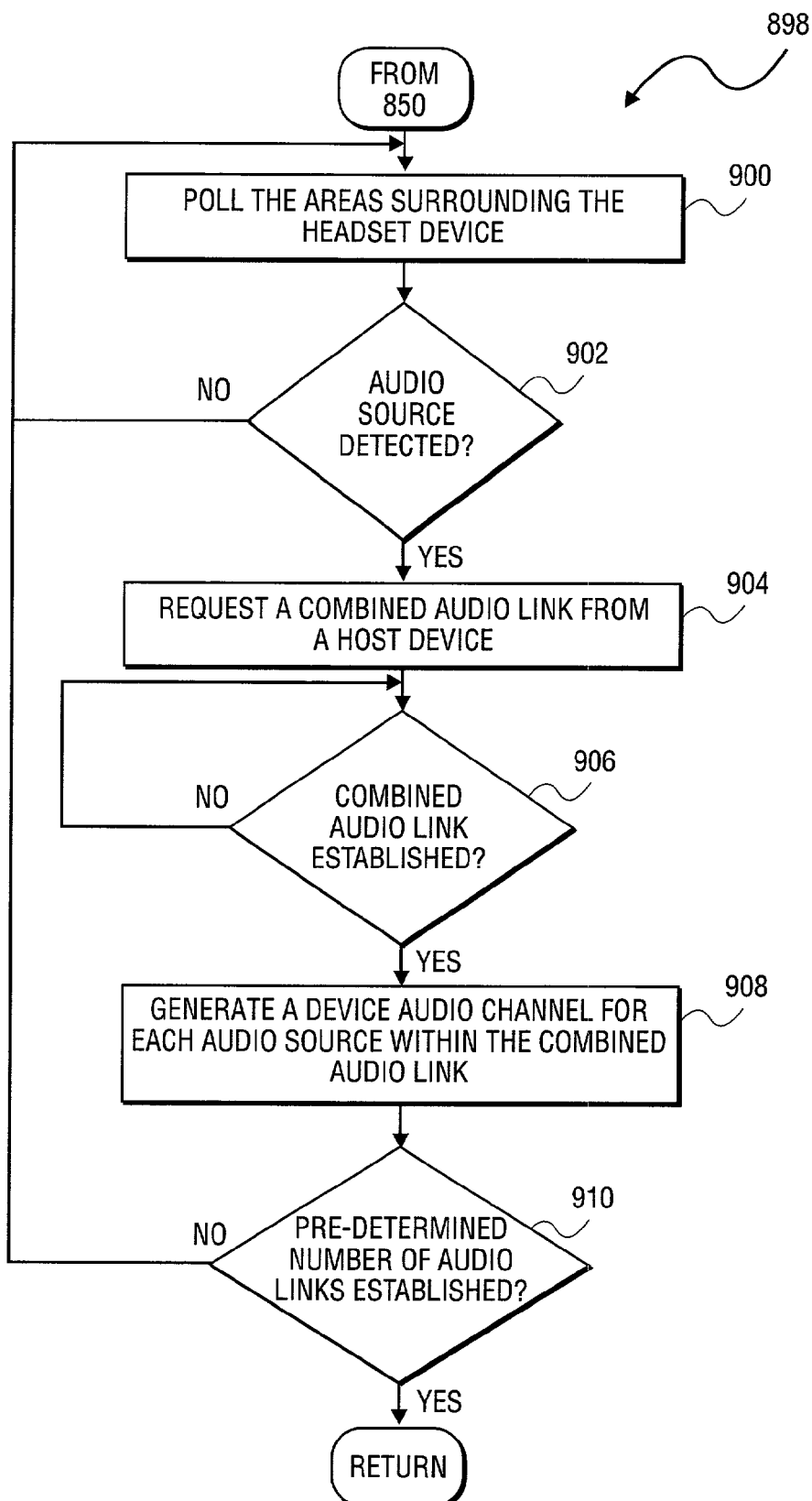
FIG. 18 depicts a flowchart illustrating an additional method for automated establishing of a predetermined number of device audio channels beyond a predefined audio channel limit, in accordance with the further embodiment of the present invention.

Referring now to FIG. 18, FIG. 18 depicts a flowchart illustrating an additional method 899 for providing audio streams via one or more selected device audio channels. In the embodiment described, the wireless device automatically establishes combined audio links until a predetermined number of audio links are established. In the embodiment described, the wireless device supports up to six virtual SCO audio channels, which is double the Bluetooth™ Radio specification limit of three SCO audio channels.

Accordingly, at process block 900, the wireless device polls the area surrounding the device for audio sources within communications range. Next, at process block 902, process block 900 is repeated until an audio source is detected. Next, at process block 904, the wireless device requests a combined audio link from a host device, including voice data streams generated by the host device, as well as voice data streams generated by the audio source device. Next, at process block 906, it is determined whether the combined audio link is established.

As such, once the combined audio link is established, at process block 908, the wireless device generates a device audio channel for each audio source within the combined audio link. In the embodiment described, the wireless device generally has an audio device channel established with the host device. As a result, the wireless device establishes an additional audio channel for the detected audio source device. Finally, at process block 910, process blocks 900-908 are repeated until a predetermined number of virtual audio links are established. In one embodiment, the predetermined number of audio links is limited to six SCO audio link channels. However, in an alternate embodiment, a virtually unlimited number of device audio channels is possible depending on compression of the audio data, interference, device processing capabilities to handle the data, and other factors.

Figure 19:
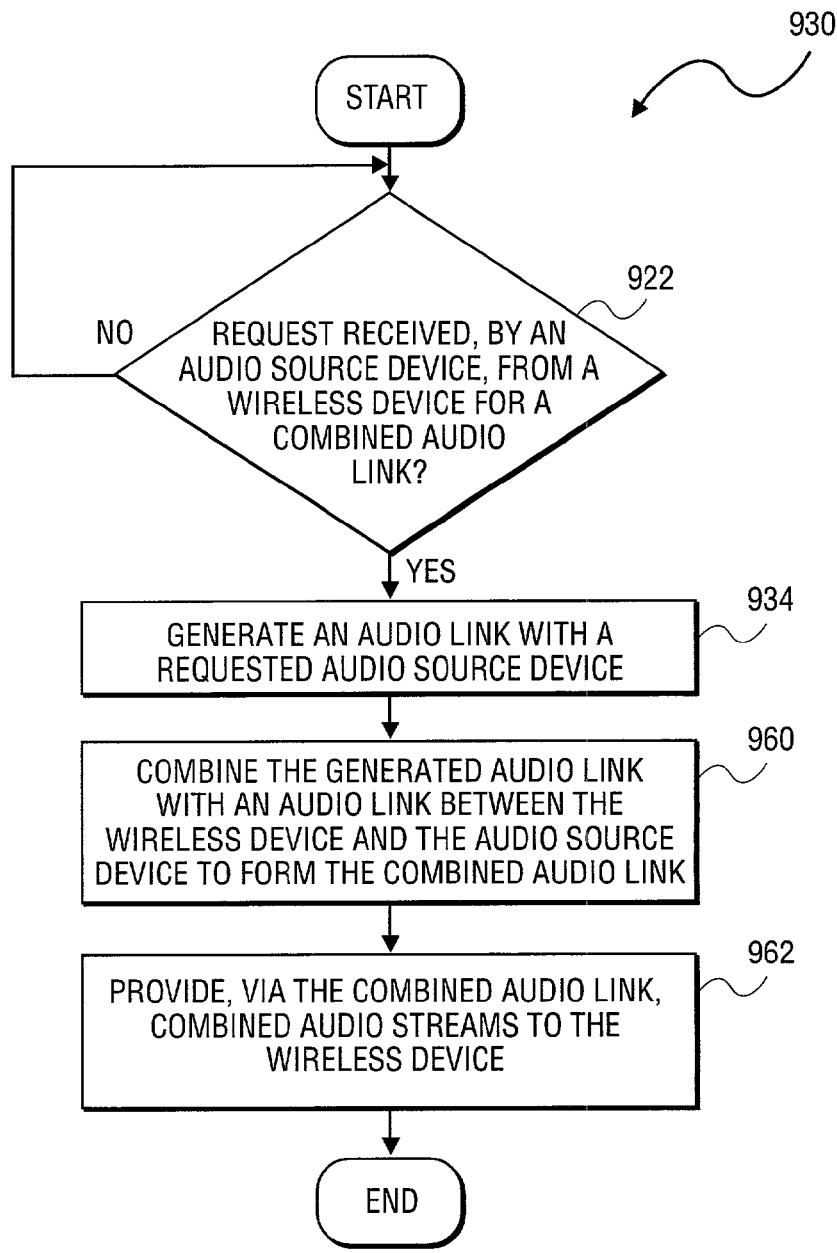
FIG. 19 depicts a flowchart illustrating a method for multiplexing multiple audio sources within a single audio link to form a combined audio link in response to a user request via a wireless device, in accordance with one embodiment of the present invention.

Referring now to FIG. 19, FIG. 19 depicts a flowchart illustrating a method 930 for multiplexing multiple audio sources within a single audio link to form a combined audio link utilizing, for example, the link manager control driver procedures 224-242, as depicted in FIG. 2A of host computer 200. At process block 922, it is determined whether a request is received by an audio source device 200 from a wireless device 180 for a combined audio link. In one embodiment, the audio source device refers to a master or host computer 200, as depicted in FIG. 2A. Once a request is received, at process block 934, the audio source device generates an audio link with an audio source device requested by the wireless device.

Once the audio link is generated, at process block 960, the audio source device combines the generated audio link with an audio link between the wireless device 180 and the audio source device 200 to form the requested combined audio link. In one embodiment, this is performed utilizing the combined audio link generation procedures 226. Finally, at process block 962, the audio source device provides, via the combined audio link, combined or multiplexed audio streams from the audio source device, as well as the requested audio source, to the wireless device, utilizing for example, the encoded packet transmission procedures 238.

Figure 20:
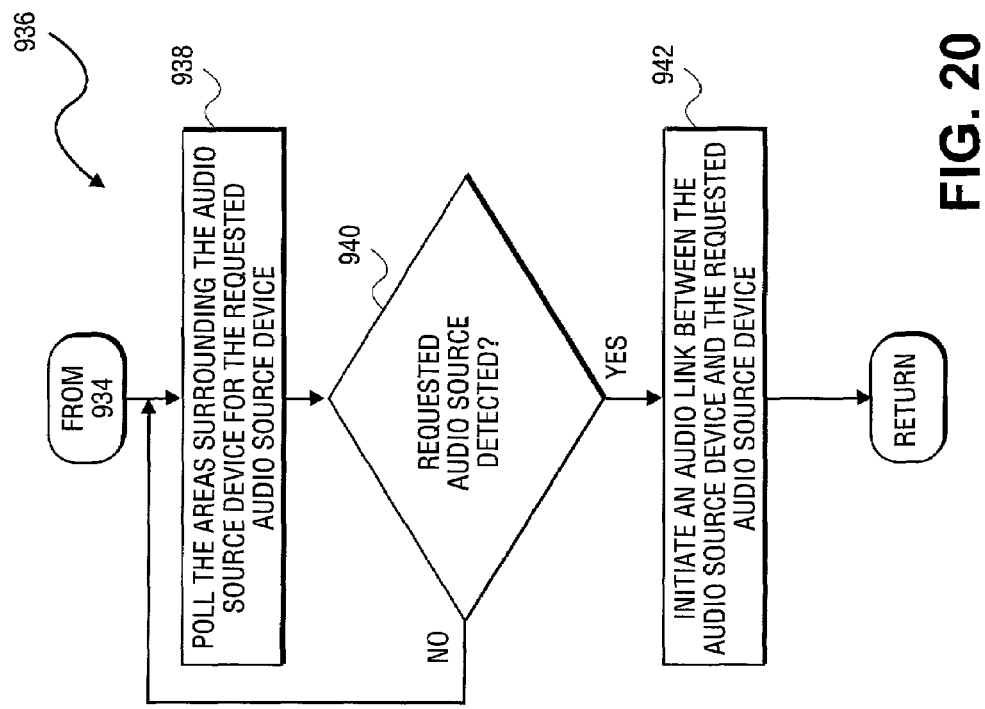
FIG. 20 depicts a flowchart illustrating an additional method for initiating the communication link with a requested audio source device in accordance with one embodiment of the present invention.

Referring now to FIG. 20, FIG. 20 depicts a flowchart illustrating an additional method 936 for generating an audio link with a requested audio source at process block 934. At process block 938, the audio source, or host device 200, polls its surrounding area for the requested audio source device. Accordingly, at process block 940, process block 938 is repeated until the requested audio source is detected. Finally, at process block 942, the device initiates an audio link between itself and the requested audio source device. In one embodiment, this is performed utilizing device detection procedures 240 and device authentication procedures 242, as depicted in FIG. 2A.

Figure 21:
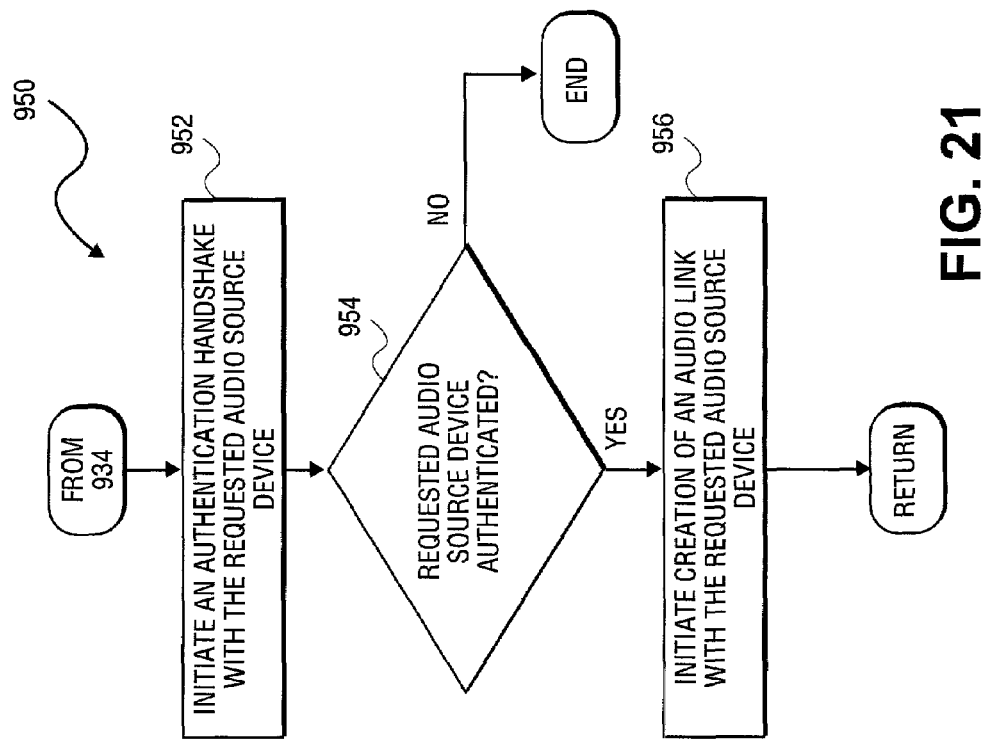
FIG. 21 depicts a flowchart illustrating an additional method for authenticating a requested audio source device in accordance with the further embodiment of the present invention.

Referring now to FIG. 21, FIG. 21 depicts a flowchart illustrating an additional method 950 for generating an audio link with the requested audio source device at process block 934. At process block 952, the device initiates an authentication handshake with the requested audio source device. Next, at process block 954, it is determined whether the audio source device is authenticated. When authentication failure occurs, the method terminates. Otherwise, at process block 956, the device initiates creation of an audio link with the requested audio source device.

Figure 22:
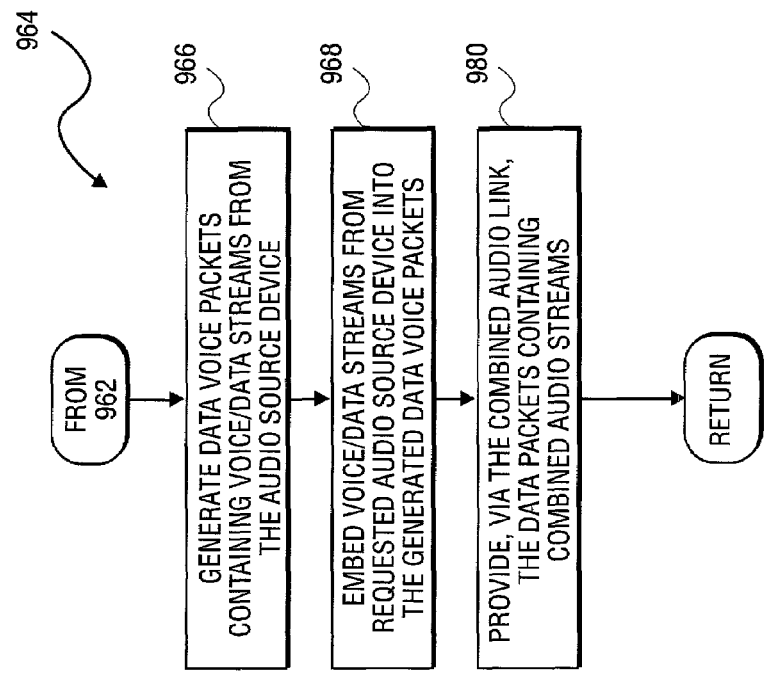
FIG. 22 depicts a flowchart illustrating an additional method for encoding voice streams from multiple audio sources within a single communication packet, in accordance with an exemplary embodiment of the present invention.

Referring now to FIG. 22, FIG. 22 depicts a flowchart illustrating an additional method 964 for providing combined audio streams via the combined audio link to the wireless device of process block 962, as depicted in FIG. 19. At process block 966, the host device 200 generates data voice packets containing voice streams from the audio source, or host device 200. Next, at process block 968, the audio source/host device 200 embeds the voice/data streams from the requested audio source device into the generated data voice packets. Finally, at process block 980, the device provides, via the combined audio link, the data packets containing the combined audio streams to the wireless device via the requested combined audio link. In one embodiment, this is performed utilizing the packet encoding procedures 228, as well as the data voice stream embedding procedures 236 to form an embedded data-voice packet 750, as depicted in FIG. 8.

Figure 23:
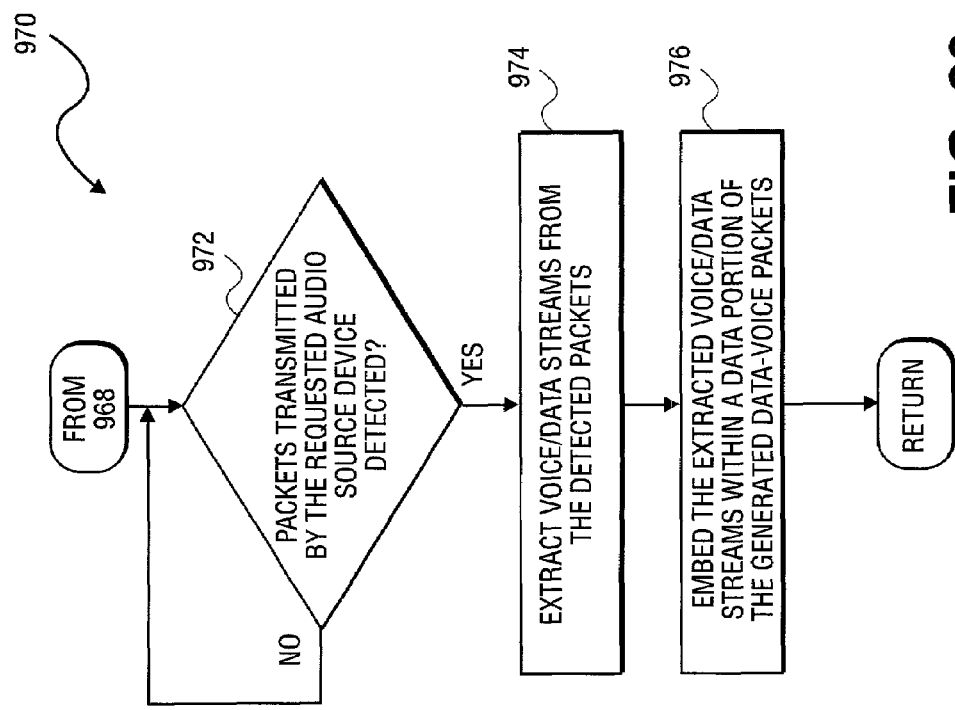
FIG. 23 depicts a flowchart illustrating an additional method for generating a combined packet, including audio streams from a plurality of audio source devices requested by a user via a wireless device, in accordance with an exemplary embodiment of the present invention.

Finally, referring to FIG. 23, FIG. 23 depicts a flowchart illustrating an additional method 970 for embedding voice data streams from the requested audio source device into the generated data voice packets of process block 968, as depicted in FIG. 22. At process block 972, it is determined whether packets transmitted by the requested audio source device are detected, utilizing for example, packet detection procedures 230. Once detected, at process block 974, the device extracts voice/data streams from the detected packets, utilizing for example, the data voice stream extraction procedures 234. Finally, at process block 976, the device embeds the extracted voice/data streams within a data portion of the generated data voice packets of process block 966.

Accordingly, utilizing the teachings of the present invention, a device, such as for example, a Bluetooth™ enabled headset device, may provide the user with the capability to select and simultaneously listen to one or more device audio channels via the headset device. In addition, using mechanical means or voice commands, the user may switch the selection of audio source devices provided via the headset device. This capability may be utilized to listen to multiple audio source simultaneously, using a single headset device, which would be implemented favorably by coaches, device users, or the like.

Finally, the embodiments of the present invention enable a device user to request additional audio channels beyond the three SCO audio channel limits specified by the Bluetooth™ System Specification. In response to such a request, the host device can multiplex multiple audio streams within a combined audio link, which are provided to the user of the wireless device. In one embodiment, this is provided by encoding voice packets within a data voice packet. In certain embodiments, compression may be utilized to multiplex and encode voice data streams from multiple audio source devices within a single data voice packet. This data voice packet is then transmitted to the wireless device via the combined audio link. The wireless device is then responsible for extracting the various voice streams from the various requested audio source devices, as well as the host device, and providing the extracted voice streams via respective device audio channels, which may be selected by the user and provided via the wireless device.

Alternate Embodiments

Several aspects of one implementation of the audio source multiplexing and audio channel switching device for simultaneously providing one or more selected audio channels to a device user have been described. However, various implementations of the audio channel switching device provide numerous features including, complementing, supplementing, and/or replacing the features described above. Features can be implemented as part of the wireless device or as part of the host device in different implementations. In addition, the foregoing description, for purposes of explanation, used specific nomenclature to provide a thorough understanding of the embodiments of the invention. However, it will be apparent to one skilled in the art that the specific details are not required in order to practice the invention.

In addition, although an embodiment described herein is directed to a Bluetooth™ audio channel switching headset device, it will be appreciated by those skilled in the art that embodiments of the present invention can be applied to other systems. In fact, systems for wireless communication with multiple audio sources are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The embodiments of the present invention provides many advantages over known techniques. In one embodiment, the present invention includes the ability to provide a single headset incorporating multiple audio sources without requiring additional external switching devices. In addition, a switching mechanism is provided, which enables a user of the headset to toggle between various neighboring piconets or multiplex multiple piconets to listen to additional audio sources simultaneously. In addition, mechanical or voice based audio channel switching is provided to enable a user to simultaneously listen to multiple audio sources or toggle between various audio sources, as well as disregarding one or more of the available audio sources via communications channels. Finally, a single headset can be implemented and utilized for multiple functions, such as listening to music while maintaining the capability to answer the telephone during listening to the music.

Having disclosed exemplary embodiments and the best mode, modifications and variations may be made to the disclosed embodiments while remaining within the scope of the invention as defined by the following claims.

What is claimed is:

1. A method comprising:
    detecting at least two audio sources within communication range of a wireless device;
    establishing an audio link with each audio source device of the at least two detected audio sources;
    providing, via at least two device audio channels, audio streams to a user of the wireless device, wherein the audio streams are from the audio source devices with an established audio link to the wireless device and wherein providing audio streams further comprises:
        detecting data-voice packets via a combined audio link,
        when a data voice packet is detected, extracting voice streams provided by the requested audio source device from a data portion of the detected data voice packet, and
        providing the extracted voice streams to the user via an additional audio channel; and
    switching between the at least two audio channels in response to a user voice request.

2. The method of claim 1, wherein detecting the audio sources further comprises:
    polling a surrounding area of the wireless device for audio sources within a pre-determined distance of the wireless device;
    when an audio source is detected, initiating an authentication handshake with an audio source device of the detected audio source;
    once the detected audio source device is authenticated, initiating creation of an audio link with the authenticated audio source device; and
    repeating the polling, initiating and initiating until an audio link is established with the at least two detected audio source devices.

3. The method of claim 2, wherein initiating the authentication handshake further comprises:
    determining a device ID of the detected audio source device;
    determining, according to the device ID, whether the detected audio source device is a trusted device;
    when the audio source device is a trusted device, authenticating the device to enable creation of an audio link between the detected audio source device and the wireless device; and
    otherwise, disregarding the detected audio source device.

4. The method of claim 1, further comprising:
    monitoring the user for a request for an additional device audio channel from a requested audio source device;
    when the user requests an additional device audio channel, polling one or more areas surrounding the wireless device for a requested audio source device;
    once the requested device is detected, requesting a combined audio link for a selected audio source device; and
    once the combined audio link is established, generating the additional device audio channel requested by the user.

5. The method of claim 1, wherein establishing an audio link further comprises:
    selecting an authenticated audio source device;
    generating a conmmnication connection with the authenticated audio source device to form an audio link between a headset device of the user and the selected audio source device; and
    repeating the selecting and generating until the pre-determined number of audio links are established.

6. The method of claim 1, further comprising:
    polling one or more areas surrounding a headset device of the user for additional audio source devices within the pre-determined distance of the headset device;
    when an audio source is detected, requesting a combined audio link from a host device, the combined audio link including an audio link with the host device and an audio link with the detected audio source;
    once the combined audio link is established, generating a device audio channel for each audio source within the combined audio link; and
    repeating the polling, requesting and generating until a pre-determined number of audio channels are generated.

7. The method of claim 1, wherein providing the audio sources to the user further comprises:
    generating a device audio channel for each established audio link with a detected audio source device;
    receiving, from the user, a selection for one or more of the generated device audio channels; and
    providing, via the one or more selected device audio channels, selected audio streams to the user via the wireless device.

8. The method of claim 7, further comprising:
    monitoring the user for a request to switch one or more of the audio channels;
    when a user request is detected, determining one or more audio channels selected by the user; and
    providing, via the one or more selected audio channels, selected audio streams to the user via the wireless device.

9. The method of claim 1, wherein providing audio streams further comprises:
    extracting voice-data streams generated by the selected audio source device from a voice portion of the data-voice packet, and
    providing the extracted voice-data streams to the user via an audio channel of the selected audio source device.

10. A computer readable storage medium including program instructions that direct a computer to function in a specified manner when executed by a processor, the program instructions comprising:
    detecting at least two audio sources within communication range of a wireless device;
    establishing an audio link with each audio source device of the at least two detected audio sources;
    providing, via at least two device audio channels, audio streams to a user of the wireless device wherein the audio streams are the audio source devices with an established audio link to the wireless device and wherein providing audio streams further comprises:

detecting data-voice packets via a combined audio link, when a data voice packet is detected, extracting voice streams provided by the requested audio source device from a data portion of the detected data voice packet, and providing the extracted voice streams to the user via an additional audio channel; and switching between the at least two audio channels in response to a user voice request.

11. The computer readable storage medium of claim 10, wherein detecting the audio sources further comprises:

polling a surrounding area of the wireless device for audio sources within a pre-determined distance of the wireless device;

when an audio source is detected, initiating an authentication handshake with an audio source device of the detected audio source;

once the detected audio source device is authenticated, initiating creation of an audio link with the authenticated audio source device; and repeating the polling, initiating and initiating until an audio link is established with each audio source device of the at least two detected audio sources.

12. The computer readable storage medium of claim 11, wherein initiating the authentication handshake further comprises:

determining a device ID of the detected audio source device;

determining, according to the device ID, whether the detected audio source device is a trusted device;

when the audio source device is a trusted device, authenticating the device to enable creation of an audio link between the detected audio source device and the wireless device; and otherwise, disregarding the detected audio source device.

13. The computer readable storage medium of claim 10, further comprising:

monitoring the user for a request for at least one additional device audio channel from a requested audio source device;

when the user requests the additional device audio channel, polling oen or more areas surrounding the wireless device for a requested audio source device;

once the requested device is detected, requesting a combined audio link for a selected audio source device; and once the combined audio link is established, generating the additional device audio channel requested by the user.

14. The computer readable storage medium of claim 10, wherein establishing an audio link further comprises:

selecting an authenticated audio source device;

generating a communication connection with the authenticated audio source device to form an audio link between the headset device and the selected audio source device; and repeating the selecting and generating until the pre-determined number of audio links are established.

15. The computer readable storage medium of claim 14, further comprising:

polling one or more areas surrounding headset device of the user for additional audio source devices within the pre-determined distance of the headset device;

when an audio source is detected, requesting a combined audio link from a host device, the combined audio including an audio link with the host device and an audio link with the detected audio source device;

once the combined audio source link is established by the host source device, generating a device audio channel for each audio source within the combined audio link; and repeating the polling, requesting and generating until a pre-determined number of audio channels are generated.

16. The computer readable storage medium of claim 10, wherein providing the audio sources to the user further comprises:

generating a device audio channel for each established audio link with a detected audio source device;

receiving, from the user, a selection for one or more of the generated device audio channels; and providing, via the one or more selected device audio channels, selected audio streams to the user via the wireless device.

17. The computer readable storage medium of claim 16, wherein providing audio streams further comprises:

monitoring the user for a request to switch one or more of the audio channels;

when a user request is detected, determining one or more audio channels selected by the user; and providing, via the one or more selected audio channels, selected audio streams to the user via the wireless device.

18. A method comprising:

receiving, by an audio source device, a request from a wireless device for a combined audio link;

generating an audio link with at least one requested audio source device;

combining the generated audio link with an audio link between the audio source device and the wireless device, thereby forming the combined audio link;

providing, via the combined audio link, combined audio streams from the audio source device and the at least one requested audio source device, to the wireless device; and switching between the combined audio link and one of the generated audio link and the audio link between the audio source device and the wireless device in response to a user request.

19. The method of claim 18, wherein generating the audio link further comprises:

polling one or more areas surrounding the audio source device for the requested audio source device; and once the requested audio source is detected, initiating an audio link between the audio source device and the requested audio source device.

20. The method of claim 18, wherein generating an audio link file further comprises:

initiating an authentication handshake with the requested audio source device; and once the requested audio source device is authenticated, initiating creation of an audio link with the requested audio source device.

21. The method of claim 18, wherein providing combined audio streams further comprises:

generating data voice packets containing voice/data streams from the audio source device;

embedding voice data streams from the requested audio source device into the data voice packets; and providing, via the combined audio link, the data voice packets containing combined audio from the audio source device and the requested audio source device to the wireless device.

22. The method of claim 21, wherein embedding voice/data streams further comprises:
   detecting packets transmitted by the requested audio source device;
   extracting voice/data streams from the detected packets; and
   embedding the extracted voice/data streams within a data portion of the generated data voice packets.

23. A computer readable storage medium including program instructions that direct a computer to function in a specified manner when executed by a processor, the program instructions comprising:
   receiving, by an audio source device, a request from a wireless device for a combined audio link;
   generating an audio link with at least one requested audio source device;
   combining the generated audio link with an audio link between the audio source device and the wireless device, thereby forming the combined audio link;
   providing, via the combined audio link, combined audio streams from the audio source device and the at least one requested audio source device, to the wireless device; and
   switching between the combined audio link and one of the generated audio link and the audio link between the audio source device and the wireless device in response to a user request.

24. The computer readable storage medium of claim 23, wherein generating the audio link further comprises:
   polling one or more areas surrounding the audio source device for the requested audio source device; and
   once the requested audio source is detected, initiating an audio link between the audio source device and the requested audio source device.

25. The computer readable storage medium of claim 23, wherein generating an audio link file further comprises:
   initiating an authentication handshake with the requested audio source device; and
   once the requested audio source device is authenticated, initiating creation of an audio link with the requested audio source device.

26. The computer readable storage medium of claim 23, wherein providing combined audio further comprises:
   generating data voice packets containing voice/data streams from the audio source device;
   embedding voice data streams from the requested audio source device wherein the data voice packets; and
   providing, via the combined audio link, the data voice packets containing combined audio from the audio source device and the requested audio source device to the wireless device.

27. The computer readable storage medium of claim 26, wherein embedding voice/data streams further comprises:
   generating data voice packets containing voice/data streams from the audio source device of the data voice packets;
   embedding voice data streams from the requested audio source device into the data voice packets; and
   providing, via the combined audio link, the data voice packets containing combined audio from the audio source device and the requested audio source device to the wireless device.

28. An apparatus, comprising:
   a processor to establish an audio link with at least two audio sources within communication range of the apparatus;
   a communications interface coupled to the processor, the communications interface to generate an audio channel for each audio source device of the at least two detected audio sources, and to provider the user of the apparatus with access to at least two generated audio channels; and
   a channel selection unit to receive a selection from the user for one or more of the at least two generated audio channels, to provide the selected channels to the user via the communications interface and to switch between the at least two audio channels in response to a user request,
   wherein the channel selection device enables the user to request additional device audio channels, such that the processor requests a combined audio link for a selected audio source device; and
   wherein the communications interface generates an additional device audio channel once the combined audio link is generated.

29. The apparatus of claim 28, wherein the communication interface extracts voice/data stream from a data portion of data/voice packets detected from the combined audio link and provides the extracted voice/data stream to the user via the additional device audio channel.

30. The apparatus of claim 28, wherein the channel selection device is one of a voice activated channel selection device and a mechanically activated channel selection device.

31. A system comprises:
   at least two audio source devices; and
   a host device including an audio link combination unit to combine a generated audio link to a requested audio source device with an audio link between the host device and a wireless device, thereby forming a combined audio link; and to provide, via the combined audio link, combined audio streams from the audio source device and the requested audio source device, to the wireless device; and
   the wireless device further includes:
      a processor to establish an audio link with the at least two of audio sources device within communication range of the wireless device,
      a communications interface coupled to the processor, the communications interface to generate an audio channel for each of the at least two audio source devices, and to provide a user of the wireless device with access to each device audio channel, and
      a channel selection unit to receive a selection from the user for one or more of the generated device audio channels, to provide the selected device audio channels to the user via the communications interface, and to switch between the at least two audio channels in response to a user request,
      wherein the channel selection device is one of a voice activated channel selection device and mechanically activated channel selection device; and
      wherein the communication interface extracts voice/data stream from a data portion of datalvoice packets detected from a combined audio link and provides the extracted voice/data streams to the user via an additional device audio channel.

32. The system of claim 31:
wherein the channel selection device enables the user to request additional audio channels, such that the processor requests a combined audio link for the host device; and wherein the communications interface generates an additional device audio channel once the combined audio link is generated.

* * * * *

UNITED STATES PATENT AND TRADEMARK OFFICE
CERTIFICATE OF CORRECTION

| | | |
|---|---|---|
| PATENT NO. | : 7,369,532 B2 | Page 1 of 1 |
| APPLICATION NO. | : 10/085661 | |
| DATED | : May 6, 2008 | |
| INVENTOR(S) | : Silvester | |

It is certified that error appears in the above-identified patent and that said Letters Patent is hereby corrected as shown below:

In column 26, at line 8, delete "provider" and insert --provide--.
In column 26, at line 64, delete "datalvoice" and insert --data/voice--.

Signed and Sealed this

Twenty-fourth Day of March, 2009

JOHN DOLL
*Acting Director of the United States Patent and Trademark Office*